(12) United States Patent
Ma et al.

(10) Patent No.: US 12,278,957 B2
(45) Date of Patent: Apr. 15, 2025

(54) VIDEO ENCODING AND DECODING METHODS, ENCODER, DECODER, AND STORAGE MEDIUM

(71) Applicant: GUANGDONG OPPO MOBILE TELECOMMUNICATIONS CORP., LTD., Dongguan (CN)

(72) Inventors: Yanzhuo Ma, Dongguan (CN); Ruipeng Qiu, Dongguan (CN); Junyan Huo, Dongguan (CN); Shuai Wan, Dongguan (CN); Fuzheng Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 141 days.

(21) Appl. No.: 18/127,616

(22) Filed: Mar. 28, 2023

(65) Prior Publication Data
US 2023/0239470 A1    Jul. 27, 2023

Related U.S. Application Data

(63) Continuation of application No. PCT/CN2020/119732, filed on Sep. 30, 2020.

(51) Int. Cl.
*H04N 19/147* (2014.01)
*G06V 10/82* (2022.01)
(Continued)

(52) U.S. Cl.
CPC .......... *H04N 19/117* (2014.11); *G06V 10/82* (2022.01); *H04N 19/17* (2014.11); *H04N 19/184* (2014.11)

(58) Field of Classification Search
CPC .... H04N 19/117; H04N 19/17; H04N 19/184; H04N 19/147; H04N 19/176;
(Continued)

(56) References Cited

U.S. PATENT DOCUMENTS 10,735,735 B2 * 8/2020 Andersson ........... H04N 19/159
10,803,583 B2 * 10/2020 Wang .................. G06V 10/764
(Continued)

FOREIGN PATENT DOCUMENTS

| CN | 110971915 A | 4/2020 |
| CN | 111133756 A | 5/2020 |

(Continued)

OTHER PUBLICATIONS

Guo Lu, et al. "DVC: An End-to-end Deep Video Compression Framework", Apr. 7, 2019.
(Continued)

*Primary Examiner* — Philip P. Dang
(74) *Attorney, Agent, or Firm* — BAYES PLLC

(57) ABSTRACT

A video encoding method is applicable to an encoder, and comprises: determining side information having a correlation with a current coding unit; filtering first relevant information to be coded of the current coding unit by using a preset network model and the side information, to obtain second relevant information to be coded; and inputting the second relevant information to be coded into a subsequent coding module for encoding, to obtain a bitstream.

9 Claims, 18 Drawing Sheets

(51) Int. Cl.
*H04N 19/117* (2014.01)
*H04N 19/17* (2014.01)
*H04N 19/184* (2014.01)
*H04N 19/59* (2014.01)

(58) Field of Classification Search
CPC ...... H04N 19/521; H04N 19/82; G06N 3/048; G06N 3/0455; G06N 3/0464; G06V 10/82
See application file for complete search history.

(56) References Cited

U.S. PATENT DOCUMENTS

| | | | |
|---|---|---|---|
| 10,869,036 B2* | 12/2020 | Coelho | H04N 19/19 |
| 11,196,992 B2* | 12/2021 | Huang | G06N 3/04 |
| 11,494,658 B2* | 11/2022 | Chen | G06N 3/044 |
| 11,689,726 B2* | 6/2023 | Mukherjee | H04N 19/176 375/240.22 |
| 2020/0162789 A1* | 5/2020 | Ma | H04N 21/440263 |
| 2020/0213587 A1 | 7/2020 | Galpin et al. | |
| 2020/0252654 A1 | 8/2020 | Su et al. | |
| 2020/0280717 A1* | 9/2020 | Li | G06N 3/08 |
| 2020/0404340 A1 | 12/2020 | Xu | |
| 2021/0021823 A1 | 1/2021 | Na et al. | |
| 2021/0092413 A1* | 3/2021 | Tsukuba | H04N 19/80 |
| 2023/0300354 A1* | 9/2023 | Li | H04N 19/42 375/240.03 |

FOREIGN PATENT DOCUMENTS

| | | |
|---|---|---|
| CN | 111194555 A | 5/2020 |
| CN | 111464815 A | 7/2020 |
| WO | 2019154152 A1 | 8/2019 |
| WO | 2019194425 A1 | 10/2019 |
| WO | 2020062074 A1 | 4/2020 |

OTHER PUBLICATIONS

J. Balle, V. Laparra, and E. P. Simoncelli, "End-to-end optimized image compression", arXiv preprint, arXiv:1611.01704, Nov. 5, 2016. 1, 2, 4, 5.

J. Balle, D. Minnen, S. Singh, S. J. Hwang, and N. Johnston, "Variational image compression with a scale hyperprior", arXiv preprint arXiv:1802.01436, 2018. 1, 2, 5, 8.

International Search Report in the international application No. PCT/CN2020/119732, mailed on Jul. 7, 2021.

Written Opinion of the International Searching Authority in the international application No. PCT/CN2020/119732, mailed on Jul. 7, 2021.

Lu Guo et al: "An End-to-End Learning Framework for Video Compression", IEEE Transactions on Pattern Analysis and Machine Intelligence, IEEE Computer Society, USA, vol. 43, No. 10, Apr. 20, 2020 (Apr. 20, 2020), pp. 3292-3308, XP011875084, ISSN: 0162-8828, DOI: 10.1109/TPAMI.2020.2988453, abstract; figures 1-8, paragraphs [0003]-[0006]. 17 pages.

Huo Shuai et al: "Convolutional Neural Network-Based Motion Compensation Refinement for Video Coding", 2018 IEEE International Symposium on Circuits and Systems (ISCAS), IEEE, May 27, 2018 (May 27, 2018), pp. 1-4, XP033435053, DOI: 10.1109/ISCAS.2018.8351609, abstract; figure 1, paragraph [0III]. 4 pages.

Siwei Ma et al: "Image and Video Compression With Neural Networks: A Review", Apr. 10, 2019 (Apr. 10, 2019), pp. 1-16, XP055765818, the whole document. 16 pages.

Supplementary European Search Report in the European application No. 20955826.1, mailed on Oct. 9, 2023. 10 pages.

Eddy Ilg, Nikolaus Mayer, Tonmoy Saikia, Margret Keuper, Alexey Dosovitskiy, and Thomas Brox. "Flownet 2.0: Evolution of optical flow estimation with deep networks". Proceedings of the IEEE Conference on Computer Vision and Pattern Recognition (CVPR), 2017, pp. 2462-2470. 9 pages.

Olaf Ronneberger, Philipp Fischer, and Thomas Brox. "U-net: Convolutional networks for biomedical image segmentation". Medical Image Computing and Computer Assisted Intervention-MICCAI, pp. 234-241. Springer, 2015. 8 pages.

* cited by examiner

VIDEO ENCODING AND DECODING METHODS, ENCODER, DECODER, AND STORAGE MEDIUM

CROSS-REFERENCE TO RELATED APPLICATION

This is a continuation of International Application No. PCT/CN2020/119732 filed on Sep. 30, 2020, the contents of which are incorporated herein by reference in its entirety.

BACKGROUND

Video compression, also known as video coding, aims to eliminate redundant information in a video. With continuous development of multimedia digital video applications and increasing demands for video cloud computing, a data volume of an original video source cannot be carried by an existing transmission network bandwidth and storage resources, while a coded and compressed video is appropriate information for transmission in the network. However, traditional video compression schemes still have a problem of low compression efficiency when using steps such as motion estimation, motion compensation and residual compression. Therefore, increasing the video compression efficiency is an important task that needs to be improved constantly in the video compression technology.

SUMMARY

Embodiments of the disclosure relate to the field of video picture processing technology. The embodiments of the disclosure provide a method for encoding a video, a method for decoding a video, an encoder, a decoder and a storage medium, which may remove more redundant information and further improve the efficiency for coding/decoding the video.

In a first aspect, the embodiments of the disclosure provide a method for encoding a video. The method is applied to an encoder and includes the following operations. Side information having a correlation with a current coding unit is determined. A first relevant information to be coded of the current coding unit is filtered by using a preset network model and the side information, to obtain a second relevant information to be coded. The second relevant information to be coded is input into a subsequent coding module for encoding the second relevant information to be coded, to obtain a bitstream.

In a second aspect, the embodiments of the disclosure provide a method for decoding a video. The method is applied to a decoder and includes the following operations. A bitstream is parsed to obtain information to be decoded. The information to be decoded is input into a first decoding module, to output first decoding information of a current coding unit. Side information having a correlation with the first decoding information is determined. The first decoding information is filtered by using a preset network model and the side information, to obtain second decoding information. The current coding unit is reconstructed by using the second decoding information, to obtain a reconstructed unit of the current coding unit.

In a third aspect, the embodiments of the disclosure provide an encoder. The encoder includes a first determination module, a first filtering module, and a coding module. The first determination module is configured to determine side information having a correlation with a current coding unit. The first filtering module is configured to filter a first relevant information to be coded of the current coding unit by using a preset network model and the side information, to obtain a second relevant information to be coded. The coding module is configured to input the second relevant information to be coded into a subsequent coding module for encoding the second relevant information to be coded, to obtain a bitstream.

In a fourth aspect, the embodiments of the disclosure provide a decoder. The decoder includes a parsing module, a second determination module, a second filtering module, and a reconstruction module. The parsing module is configured to parse a bitstream to obtain information to be decoded, and input the information to be decoded into a first decoding module to output first decoding information of a current coding unit. The second determination module is configured to determine side information having a correlation with the first decoding information. The second filtering module is configured to filter the first decoding information by using a preset network model and the side information, to obtain second decoding information. The reconstruction module is configured to reconstruct the current coding unit by using the second decoding information, to obtain a reconstructed unit of the current coding unit.

In a fifth aspect, the embodiments of the disclosure provide an encoder. The encoder includes a first processor and a first memory storing a computer program executable by the first processor. When executing the program, the first processor is configured to implement the method for encoding a video by the encoder.

In a sixth aspect, the embodiments of the disclosure provide a decoder. The decoder includes a second processor and a second memory storing a computer program executable by the second processor. When executing the program, the second processor is configured to implement the method for decoding a video by the decoder.

In a seventh aspect, the embodiments of the disclosure provide a storage medium having stored thereon a computer program. The computer program, when being executed by a first processor, implements the method for encoding a video by an encoder; or, when being executed by a second processor, implements the method for decoding a video by a decoder.

Embodiments of the disclosure provide a method for encoding a video, a method for decoding a video, an encoder, a decoder and a storage medium. The method is applied to the encoder, and includes the following operations. Side information having a correlation with a current coding unit is determined. First relevant information to be coded of the current coding unit is filtered by using a preset network model and the side information, to obtain second relevant information to be coded. The second relevant information to be coded is input into a subsequent coding module for encoding the second relevant information to be coded, to obtain a bitstream. As such, during the coding process, the known side information having a correlation with the current coding unit and the preset network model are used to perform filtering on the relevant information to be coded, thereby improving the coding efficiency of the data to be coded.

DETAILED DESCRIPTION

In order to make the characteristics and technical contents of the embodiments of the disclosure understood in more detail, the implementation of the embodiments of the disclosure will be described below in combination with the drawings in detail. The appended drawings are only for description as references and not intended to limit the embodiments of the disclosure.

Figure 1:
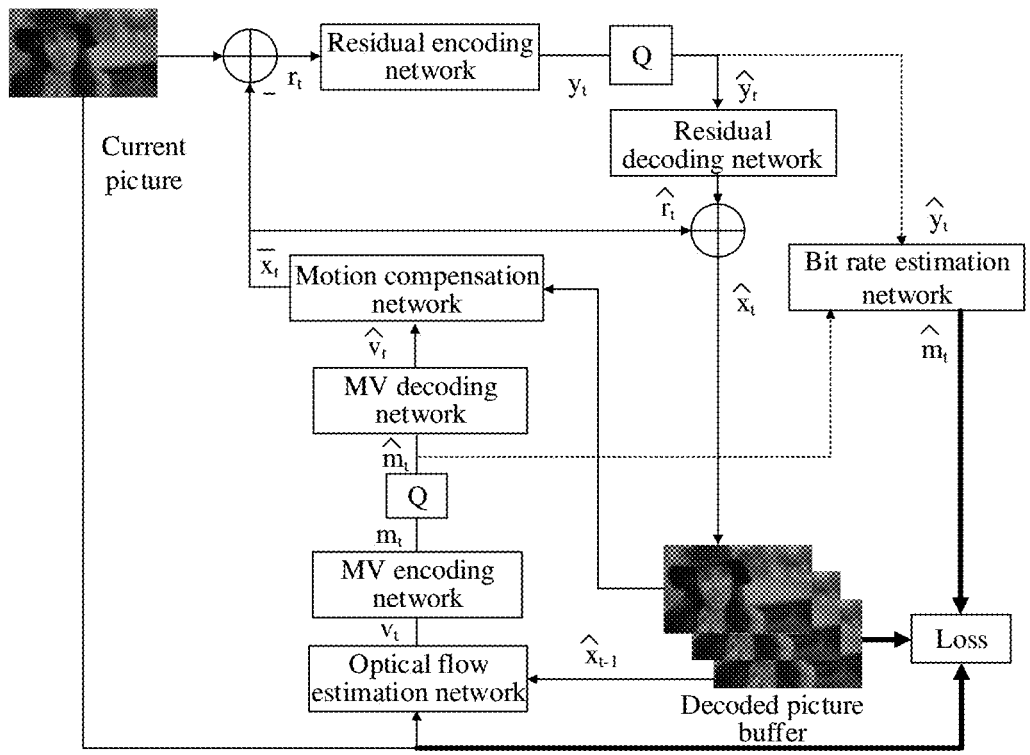
FIG. 1 is a schematic block diagram of a video encoding system according to an embodiment of the disclosure.

FIG. 1 is a schematic block diagram of a video encoding system according to an embodiment of the disclosure. As illustrated in FIG. 1, a Deep Video Compression (DVC) video encoding framework includes a residual autocodec, a quantizer Q, a residual decoding network, a bit rate estimation network, a motion compensation network, a motion vector (MV) decoding network, an MV encoding network and an optical flow estimation network.

Specifically, a current picture $x_t$ and a previous reconstructed picture $\hat{x}_{t-1}$ are input into the optical flow estimation network for motion estimation, to generate motion information, which is recorded as $v_t$. Then, the motion information $\hat{v}_t$ is encoded by using the MV encoding network, to obtain a coded result $m_t$. The result $m_t$ is quantized through the quantizer Q to obtain $\hat{m}_t$, and $\hat{m}_t$ passes through the MV decoding network to obtain reconstructed motion information $\hat{v}_t$ of the current picture. $\hat{v}_t$ and the previous reconstructed picture $\hat{x}_{t-1}$ are input into the motion compensation network to obtain a prediction picture $\bar{x}_t$ of the current picture. The prediction picture $\bar{x}_t$ is subtracted from the current picture $x_t$ to obtain residual information $r_t = x_t - \bar{x}_t$. The residual information $r_t$ is encoded by using the residual encoding network to obtain $y_t$, and $y_t$ is quantized through the quantizer Q to obtain $\hat{y}_t$. $\hat{y}_t$ is decoded by using the residual decoding network to obtain reconstructed residual information $\hat{r}_t$. The reconstructed residual information $\hat{r}_t$ and the prediction picture $\bar{x}_t$ are added to obtain a final reconstructed picture. With the encoding process of the video pictures, new reconstructed pictures are generated continuously, and these new reconstructed pictures are stored in a decoded picture buffer.

A method for encoding a video according to an embodiment of the disclosure is mainly performed before the MV encoding network and after the MV decoding network in the video encoding framework, or, before the residual encoding network and after the residual decoding network in the video encoding framework. That is, if the method for encoding the video according to the embodiment of the disclosure can have higher coding efficiency at a video encoding end, correspondingly, higher decoding efficiency can also be achieved at a decoding end.

Based on this, the technical solutions of the disclosure are further described in detail below in combination with the drawings and embodiments. Before the disclosure is described in detail, it should be noted that a term such as "first", "second" and "third" mentioned throughout the description are only for distinguishing different features, and do not have the functions of limiting a priority, a sequence, a size relationship and so on.

Embodiments of the disclosure provide a method for encoding a video, which is applied to a video encoding device, i.e., an encoder. Functions achieved by the method can be realized through calling program codes by a processor in the video encoding device. Of course, the program codes can be stored in a computer storage medium. The video encoding device includes at least the processor and a storage medium.

Figure 2:
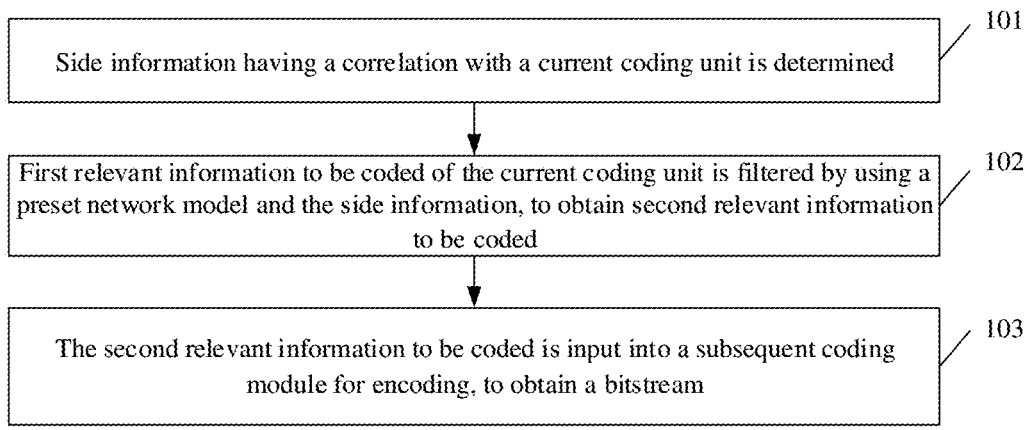
FIG. 2 is a schematic flowchart of a method for encoding a video according to an embodiment of the disclosure.

FIG. 2 is a schematic flowchart of a method for encoding a video according to an embodiment of the disclosure. The method is applied to an encoder. As illustrated in FIG. 2, the method includes the following operations.

In 101, side information having a correlation with a current coding unit is determined.

It should be noted that the coding unit is a picture or an area in the picture. When the coding unit is a picture, the encoding method can be understood as removal of redundancy using a correlation between adjacent pictures in video pictures, to achieve video compression. When the coding unit is an area in the picture (i.e., a picture block), the method can be understood as removal of redundancy using a correlation between adjacent pixels in the video pictures, to achieve video compression.

It should be noted that the method for encoding a video according to the embodiments of the disclosure may be applied to any lossy or lossless compression encoding network framework, to remove redundancy of any picture information that is written into a bitstream, thereby improving the coding efficiency.

Exemplarily, first information to be coded may be information of any video picture to be written into the bitstream, and includes motion information of the picture, residual information of the picture and the like.

It should be noted that the side information is information having a certain correlation with the first information to be coded. It is to be understood that, the side information and the first information to be coded have common information, the side information may be used for filtering redundant information from the first information to be coded before encoding, or, used for performing enhancement on decoding information (which may be understood as a prediction value of a coding unit) after decoding, such that the enhanced prediction value is closer to a real value. Thus, prediction accuracy can be effectively improved, and the coding efficiency of the subsequent information to be coded can be further improved.

Exemplarily, the side information includes at least one of the following: reconstructed units of one or more coding units prior to the current coding unit based on a coding sequence; reconstructed motion information of the current coding unit; reconstructed motion information of the one or more coding units prior to the current coding unit based on the coding sequence; distortion information of the current coding unit; or, a prediction value of the current coding unit.

It should be noted that the distortion information of the current coding unit is information obtained by performing distortion operation on the reconstructed motion information of the current coding unit and the reconstructed units of the one or more coding units prior to the current coding unit based on the coding sequence.

In practical applications, a coding unit prior to the current coding unit may be a coding unit adjacent in time prior to the current coding unit, or, a coding unit not adjacent in time prior to the current coding unit, or, a coding unit adjacent in space prior to the current coding unit, or, a coding unit not adjacent in space prior to the current coding unit.

Multiple coding units prior to the current coding unit may be multiple coding units prior to the current coding unit that are adjacent in time, or, multiple coding units prior to the current coding unit that are not adjacent in time, or, multiple coding units prior to the current coding unit that are adjacent in space, or, multiple coding units prior to the current coding unit that are not adjacent in space. It should be noted that since there is more than one type of the side information, at least one of the side information mentioned above may be used to participate in the filtering process of the first information to be coded in the embodiments of the disclosure.

In 102, first relevant information to be coded of the current coding unit is filtered by using a preset network model and the side information, to obtain second relevant information to be coded.

At the encoding end, the preset network model is used for filtering the information to be coded, thereby reducing the redundant information in the information to be coded and improving the coding efficiency. The first relevant information to be coded includes at least one of: first information to be coded of the current coding unit, or other information related to the first information to be coded, such as, first decoding information obtained according to the first information to be coded. Correspondingly, the second relevant information to be coded includes at least one of: second information to be coded of the current coding unit, or second decoding information corresponding to the first decoding information.

In 103, the second relevant information to be coded is input into a subsequent coding module for encoding, to obtain a bitstream.

In some embodiments, the preset network model includes a first network model, the first relevant information to be coded includes the first decoding information, and the second relevant information to be coded includes the second decoding information. The first network model is used for performing enhancement and filtering on the information that is decoded by the encoding end, such that the enhanced prediction value is closer to a real value, and thus prediction accuracy can be effectively improved, and the coding efficiency of the subsequent information to be coded can be further improved.

In some embodiments, the operation that the first relevant information to be coded of the current coding unit is filtered by using the preset network model and the side information, to obtain the second relevant information to be coded includes the following operations. The first decoding information corresponding to first information to be coded of the current coding unit is obtained. The first decoding information and the side information are input into the first network model to output the second decoding information. The first network model is used for performing enhancement on the first decoding information by using the side information. The operation that the second relevant information to be coded is input into the subsequent coding module for encoding, to obtain the bitstream includes the following operations. The current coding unit is reconstructed by using the second decoding information, to obtain a reconstructed unit of the current coding unit. Subsequent coding is performed according to the reconstructed unit of the current coding unit, to obtain the bitstream.

Correspondingly, the operation that the second relevant information to be coded is input into the subsequent coding module for encoding, to obtain the bitstream includes the following operations. The current coding unit is reconstructed by using the second decoding information, to obtain a reconstructed unit of the current coding unit. Subsequent coding is performed according to the reconstructed unit of the current coding unit, to obtain the bitstream. The reconstructed unit of the current coding unit may serve as side information for the subsequent coding unit, or, as side information for other information to be coded in the current coding unit. That is, the first network model is located after the decoding network at the encoding end, and is used for performing enhancement on the decoding information. It is to be understood that the first network model implements the filtering processing on the first information to be coded in the first relevant information to be coded by performing enhancement on the decoding information. With enhancement of the decoding information, for the whole network at the encoding end, using the enhanced decoding information for encoding may also achieve the purpose of reducing the redundancy of the information to be coded.

Figure 3:
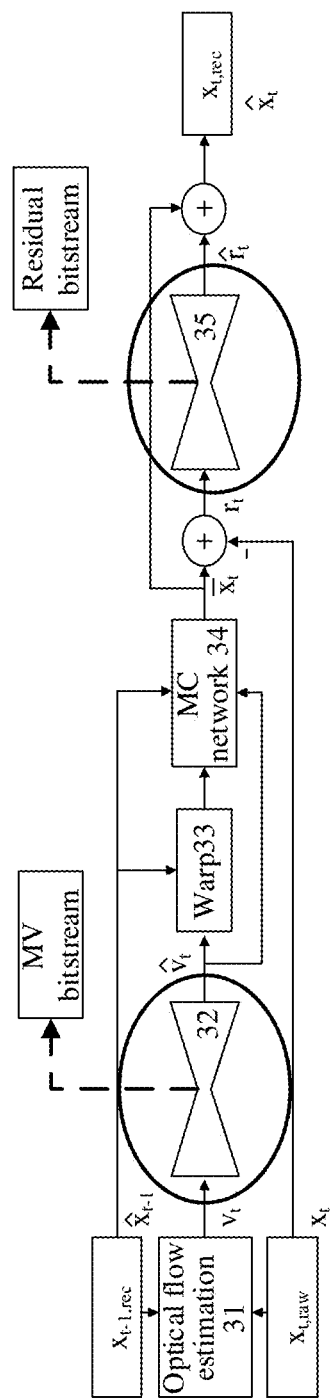
FIG. 3 is another representation of the DVC video encoding framework illustrated in FIG. 1.

FIG. 3 illustrates another representation of the DVC video encoding framework illustrated in FIG. 1. As illustrated in FIG. 3, an encoding end includes an optical flow estimation network 31, an MV autocodec network 32, a Warp 33, an MC network 34, and a residual autocodec network 35.

The coding process may include the following steps.

Step 1, motion estimation and compression: a current picture $x_t$ and a previous reconstructed picture $\hat{x}_{t-1}$ are input into the optical flow estimation network 31 for motion estimation, to generate motion information, which is recorded as $v_t$. Then, the motion information is encoded and compressed by using the MV autocodec network 32. After quantization and entropy coding (not illustrated in FIG. 3), an MV bitstream is generated. The MV autocodec network 32 performs inverse quantization and entropy decoding on the MV bitstream, and then obtains motion information $\hat{v}_t$.

Step 2, motion compensation: based on $\hat{v}_t$ and the previous reconstructed picture $\hat{x}_{t-1}$, the motion compensation is performed by using a deep neural network to obtain $\bar{x}_t$. Firstly, a distortion operation (i.e., warp 33) is performed on the previous reconstructed picture by using $v_t$, to obtain $w(\hat{x}_{t-1}, \hat{v}_t)$. $w(\hat{x}_{t-1}, \hat{v}_t)$, and $\hat{v}_t$ as inputs are input to a CNN motion compensation network (i.e., the MC network 34), to obtain a prediction picture $\bar{x}_t$.

Step 3, residual compression: a residual $r_t = x_t - \bar{x}_t$ is predicted, the residual information is compressed by the residual autocodec network 35, then quantized and entropy encoded to generate a residual bitstream. The residual autocodec network 35 performs inverse quantization and entropy decoding on the residual bitstream, and then obtains a prediction residual $\hat{r}_t$.

Step 4, video picture reconstruction: the prediction picture $\bar{x}_t$ of the current picture in Step 2 and the prediction residual $\hat{r}_t$ of the current picture in Step 3 are added to obtain a reconstructed picture $\hat{x}_t$ of the current picture.

In practical applications, the written bitstream information may include MV information, residual information and other information. When the first information to be coded is MV information, the first network model may be set after the MV autocodec network 32 to perform filtering on the decoded MV information for enhancing the MV prediction value, to improve the prediction accuracy. When the first information to be coded is residual information, the first network model may be set after the residual autocodec network 35 to perform filtering on the decoded MV information for enhancing the MV prediction value, to improve the prediction accuracy. When the first information to be coded is other information written into the bitstream, the first network model may be set after autocodec networks for the other information.

Figure 4:
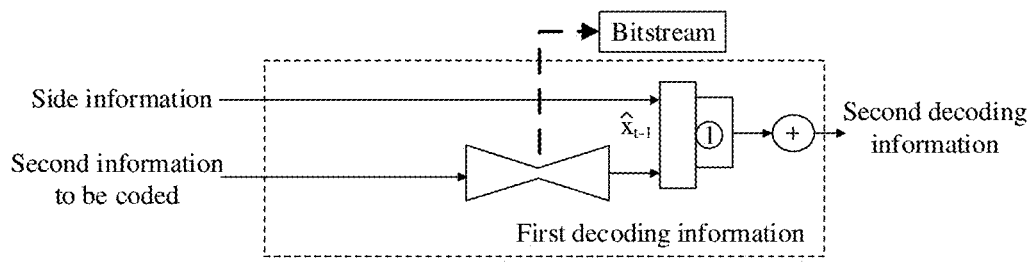
FIG. 4 illustrates a schematic diagram of a first partial structure of an encoding end network in an embodiment of the disclosure.

FIG. 4 illustrates a schematic diagram of a first partial structure of an encoding end network in an embodiment of the disclosure. As illustrated in FIG. 4, when the preset network model only includes the first network model ①, the first network model may be added after the MV autocodec network 32 and/or the residual autocodec network 35 in FIG. 3.

In some embodiments, the first network model may include at least a first neural network model.

The first neural network model includes a convolution layer(s), a residual layer(s), an average pooling layer(s) and a sampling rate conversion module(s).

In some embodiments, the first neural network model includes a first convolution layer, at least one second convolution layer, first residual layers, second residual layers, average pooling layers, and sampling rate conversion modules. The first convolution layer is followed by at least two first residual layers connected in series, and an average pooling layer is connected between the adjacent first residual layers. At least one of the first residual layers is followed by at least two second residual layers connected in series, and a sampling rate conversion module is connected between the adjacent second residual layers. At least one of the second residual layers is connected in series with the at least one second convolution layer.

Specifically, the first decoding information and the side information are input into a connection layer. The connection layer is followed by one first convolution layer. The first convolution layer is followed by at least two first residual layers connected in series, and one average pooling layer is connected between the adjacent first residual layers. At least one of the first residual layers is followed by at least two second residual layers connected in series, and one sampling rate conversion module is connected between the adjacent second residual layers. At least one of the second residual layers is followed by two second convolution layers connected in series. The last second convolution layer outputs the second decoding information.

It should be noted that the connection layer is used for concatenating the side information and the first decoding information and inputting the information into the next layer. The first convolution layer is used for extracting features from the input information and inputting the extracted features into the next layer. The average pooling layer is used for performing downsampling to reduce dimension, removing redundant information, compressing the features, simplifying network complexity, reducing computation, reducing memory consumption and so on. The sampling rate conversion module is used for performing upsampling or downsampling on the input information, and the second convolution layer is also used for extracting features from the input information.

In some embodiments, the method further includes the following operations, First category identification information is preset for the first network model, and the first category identification information is used for indicating an operating mode of the first network model. In response to the first category identification information indicating a first operating mode, the first relevant information to be coded is equal to the second relevant information to be coded, and network rate-distortion performance measurement is performed to obtain a first measurement result. In response to the first category identification information indicating a second operating mode, the first relevant information to be coded of the current coding unit is filtered by using the preset network model and the side information to obtain the second relevant information to be coded, and the network rate-distortion performance measurement is performed to obtain a second measurement result. A rate-distortion decision is made based on the first measurement result and the second measurement result, and target first category identification information corresponding to a target measurement result that represents an optimal rate-distortion performance is determined.

It should be noted that the first category identification information is used for indicating an operating mode of the first network model, and the operating mode includes the first operating mode and the second operating mode. The first information to be coded being equal to the second information to be coded may be understood as that the first network model is not used to perform filtering on the first information to be coded at the encoding end network, but the first information to be coded is directly input into the autocodec. The first operating mode is equivalent to that the first network model is disabled. In the second operating mode, the first relevant information to be coded of the current coding unit is filtered by using the preset network model and the side information, to obtain the second relevant information to be coded and further to obtain the second information to be coded, which may be understood as that the first network model is used to perform filtering on the first information to be coded at the encoding end network. The second operating mode is equivalent to that the first network model is enabled.

The rate-distortion decision is used for determining the optimal rate-distortion performance. The operating mode of the first network model is determined according to the optimal rate-distortion performance. According to the embodiments of the disclosure, the rate-distortion decision is made to decide whether to use a preset network model, and the determined first category identification information is written into a header of the bitstream to be transmitted to the decoding end. In order to cooperate with the operations at the encoding end, reverse processing is required to be performed at the decoding end after the decoding network at the same time. Therefore, the preset network model is used or not used at both the encoding end and the decoding end. In practical applications, when various categories of side information are input into the first network model, the optimal side information category for the first network model may be selected through the rate-distortion decision.

In some embodiments, the method further includes the following operations. Second category identification information is preset for the first network model, and the second category identification information is used for indicating a category of input side information. In response to the first category identification information indicating the second operating mode, the second category identification information indicates at least one category of input side information, the first relevant information to be coded of the current coding unit is filtered by using the preset network model and the side information to obtain the second relevant information to be coded, and the network rate-distortion performance measurement is performed to obtain at least one second measurement result.

Correspondingly, the operation that the rate-distortion decision is made based on the first measurement result and the second measurement result, to determine the target first category identification information corresponding to the target measurement result that represents the optimal rate-distortion performance includes the following operation. The rate-distortion decision is made based on the first measurement result and the at least one second measurement result, and the target first category identification information and target second category identification information corresponding to the target measurement result that represents the optimal rate-distortion performance are determined.

It should be noted that the first category identification information is used for indicating an operating mode of the first network model, and the operating mode includes the first operating mode and the second operating mode. The first information to be coded being equal to the second information to be coded may be understood as that the first network model is not used to perform filtering on the first information to be coded at the encoding end network. The first operating mode is equivalent to that the first network model is disabled. In the second operating mode, the first relevant information to be coded of the current coding unit is filtered by using the preset network model and the side information, to obtain the second relevant information to be coded and further to obtain the second information to be coded, which may be understood as that the first network model is used to perform filtering on the first information to be coded at the encoding end network. The second operating mode is equivalent to that the first network model is enabled.

The second category identification information is used for indicating at least one category of input side information. When the first network model is in the second operating mode, the first network model may be divided into multiple types of network models according to different categories of the input side information. The rate-distortion decision is used for determining the optimal rate-distortion performance, and the category of the side information input in the first network model under the second operating mode is determined according to the optimal rate-distortion performance According to the embodiments of the disclosure, the rate-distortion decision is made to decide whether to use a preset network model and which side information to be used as the input. The determined first category identification information and second category identification information are written into the header of the bitstream to be transmitted to the decoding end. In order to cooperate with the operations at the encoding end, reverse processing is required to be performed at the decoding end after the decoding network at the same time. Therefore, the preset network model is used at both the encoding end and the decoding end, and the side information category input into the network model that is indicated by the second category identification information at the encoding end is the same as that at the decoding end.

In practical applications, by instructing a switch to be on and off, the first category identification information and the second category identification information indicate whether to use the preset network model and which side information to be used as the input. That is, a switch may be set at an intersection of the preset network model and the backbone network, and is controlled to be on and off to select whether to use the preset network model. Moreover, a switch may be set at the input end for the side information of the preset network model, and is controlled to be on and off to select whether to input the corresponding side information into the preset network model.

In other embodiments, the preset network model may include a first network model and a second network model. The first relevant information to be coded includes first decoding information, the second relevant information to be coded includes second decoding information, the first relevant information to be coded further includes the first information to be coded, and the second relevant information to be coded further includes second information to be coded. Part of input ends of the first network model and part of input ends of the second network model are shorted to an output end. That is, part of the input ends are connected to the output end to form a semi-residual network model. Such semi-residual network model is easy to be trained and applied, and can be trained faster with higher learning efficiency and better filtering effect than a non-shorted network model.

Correspondingly, the operation that the first relevant information to be coded of the current coding unit is filtered by using the preset network model and the side information, to obtain the second relevant information to be coded includes the following operations. The first information to be coded of the current coding unit is obtained. The first information to be coded and the side information are input into the second network model to output the second information to be coded.

The operation that the second relevant information to be coded is input into the subsequent coding module for encoding, to obtain the bitstream includes the following operation. The second information to be coded is input into a first coding module after the second network model to obtain the bitstream. The second network model is used for performing filtering on the first information to be coded according to a correlation between the first information to be coded and the side information. The first coding module may be an encoding portion of the MV autocodec network 32, or an encoding portion of the residual autocodec network 35 in FIG. 3.

Correspondingly, the operation that the first decoding information corresponding to the first information to be coded of the current coding unit is obtained includes the following operation. The bitstream is input into a first decoding module to obtain the first decoding information corresponding to the first information to be coded. The first decoding module may be a decoding portion of the MV autocodec network 32, or a decoding portion of the residual autocodec network 35 in FIG. 3.

The first information to be coded and the side information are input into the second network model, to output the second information to be coded. The second network model is used for performing filtering on the first information to be coded according to a correlation between the first information to be coded and the side information.

That is, the first network model and the second network model perform the filtering processing on the written bitstream information. The first network model is located after the decoding network, and is used for performing enhancement on the decoding information. It can be understood that the first network model implements the filtering processing on the first information to be coded by performing enhancement on the decoding information. With enhancement of the decoding information, for the whole network at the encoding end, usage of the enhanced decoding information may also achieve the purpose of reducing the redundancy of the information to be coded. The second decoding network is located before the autocodec, and is used for removing the common information between the first information to be coded and the side information. Therefore, the second information to be coded carries less information than the first information to be coded, and after entering the autocodec network, a bitstream with a lower bitrate can be obtained under the same distortion, thereby effectively improving the coding efficiency.

In practical applications, the written bitstream information may include MV information, residual information and other information. When the first information to be coded is MV information, the first network model may be set after the MV autocodec network 32 to improve the prediction accuracy, and the second network model may be set before the MV autocodec network 32 to improve the coding efficiency. When the first information to be coded is residual information, the first network model may be set after the residual autocodec network 35 to improve the prediction accuracy, and the second network model may be set before the residual autocodec network 35 to improve the coding efficiency. When the first information to be coded is other information written into the bitstream, the first network model may be set after autocodec networks for the other information.

That is, the preset network model according to the embodiments of the disclosure can perform filtering on at least one of the MV information, the residual information, or other information.

Figure 5:
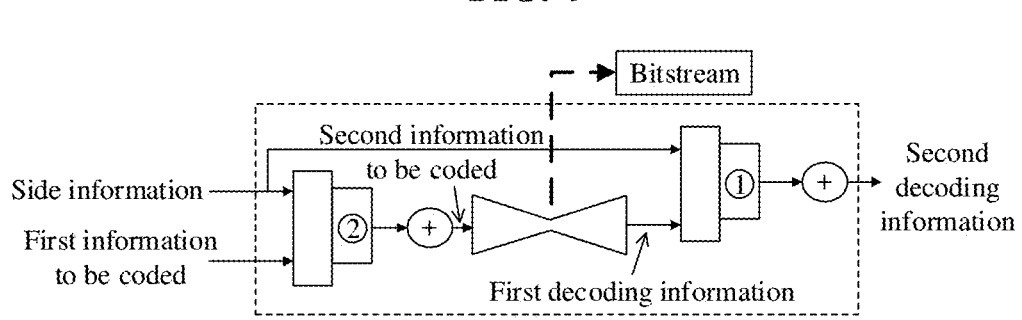
FIG. 5 illustrates a schematic diagram of a second partial structure of an encoding end network in an embodiment of the disclosure.

FIG. 5 illustrates a schematic diagram of a second partial structure of an encoding end network in an embodiment of the disclosure. As illustrated in FIG. 5, when the preset network model includes the first network model ① and the second network model ②, the first network model may be added after the MV autocodec network 32 and/or the residual autocodec network 35 in FIG. 3, and the second network model may be added before the MV autocodec network 32 and/or the residual autocodec network 35 in FIG. 3.

The second network model includes at least a second neural network model. The second neural network model may include a convolution layer, a residual layer, an average pooling layer and a sampling rate conversion module. In some embodiments, the second neural network model may include a first convolution layer, second convolution layers, first residual layers, second residual layers, an average pooling layer, and a sampling rate conversion module. The first convolution layer is followed by at least two first residual layers connected in series, and an average pooling layer is connected between the adjacent first residual layers. At least one of the first residual layers is followed by at least two second residual layers connected in series, and a sampling rate conversion module is connected between the adjacent second residual layers. At least one of the second residual layers is connected in series with at least one second convolution layer.

Specifically, the first information to be coded and the side information are input into a connection layer. The connection layer is followed by one first convolution layer. The first convolution layer is followed by at least two first residual layers connected in series, and one average pooling layer is connected between the adjacent first residual layers. At least one of the first residual layers is followed by at least two second residual layers connected in series, and one sampling rate conversion module is connected between the adjacent second residual layers. At least one of the second residual layers is followed by two second convolution layers connected in series. The last second convolution layer outputs the second information to be coded.

It should be noted that the connection layer is used for concatenating the side information and the first information to be coded and inputting the information into the next layer. The first convolution layer is used for extracting features from the input information and inputting the extracted features into the next layer. The average pooling layer is used for performing downsampling to reduce dimension, removing redundant information, compressing the features, simplifying network complexity, reducing computation, reducing memory consumption and so on. The sampling rate conversion module is used for performing upsampling or downsampling on the input information, and the second convolution layer is also used for extracting features from the input information.

Figure 6:
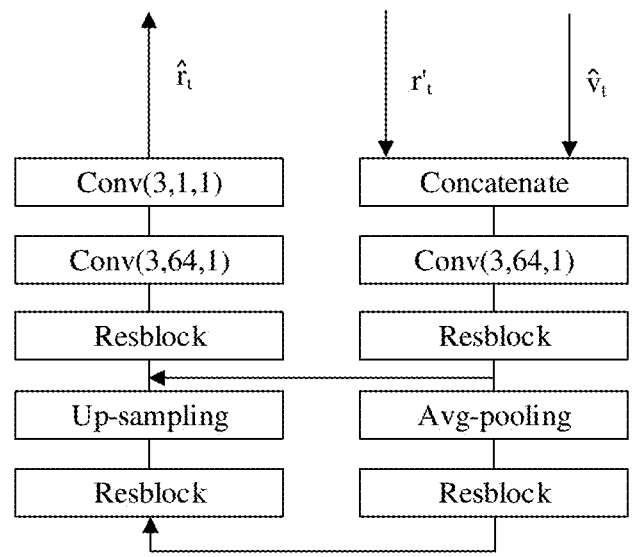
FIG. 6 illustrates a first structure diagram of a first network model in an embodiment of the disclosure.

FIG. 6 illustrates a first structure diagram of a first network model in an embodiment of the disclosure. As illustrated in FIG. 6, taking the first information to be coded to be residual information as an example, the prediction residual $r'_t$ directly output from the residual autocodec network 35 and the side information $\hat{v}_t$ are input into a connection layer (Concatenate). The connection layer is followed by a convolution layer (Conv(3,64,1)), the convolution layer is followed by two first residual layers (Resblock) sequentially connected in series, and an average pooling layer (Avg-pooling) is connected between the adjacent first residual layers. The first residual layer is followed by two second residual layers sequentially connected in series, and an up-sampling module (Up-sampling) is connected between the adjacent second residual layers. The second residual layer is followed by two second convolution layers (i.e., Conv(3,64,1) and Conv(3,1,1)) sequentially connected in series. The last convolution layer outputs the final prediction residual $\hat{r}_t$. The number of the first residual layers is equal to the number of the second residual layers, and the information output from the first residual layer is also input into a second residual layer corresponding to the first residual layer.

Figure 7:
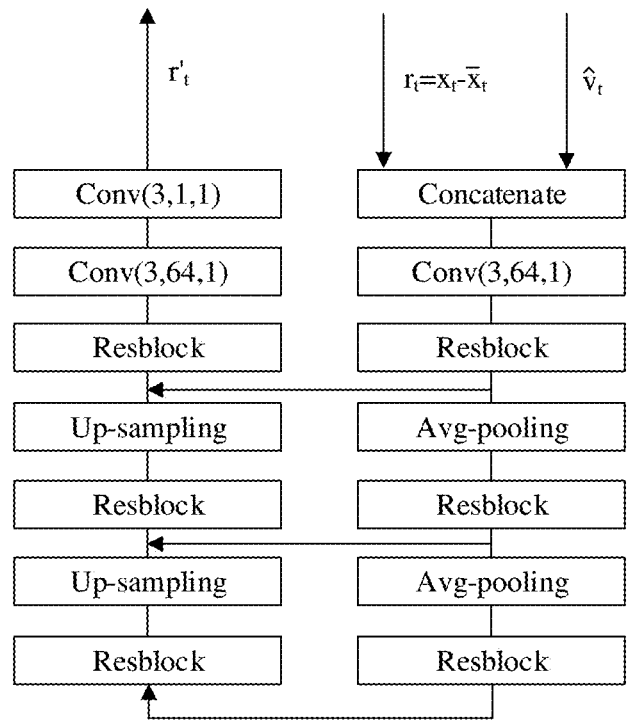
FIG. 7 illustrates a first structure diagram of a second network model in an embodiment of the disclosure.

FIG. 7 illustrates a first structure diagram of a second network model in an embodiment of the disclosure. As illustrated in FIG. 7, taking the first information to be coded to be residual information as an example, the prediction residual $r_t = x_t - \bar{x}_t$ obtained before the residual autocodec network 35 and the side information $\hat{v}_t$ are input into a connection layer (Concatenate). The connection layer is followed by a convolution layer (Conv(3,64,1)), and the convolution layer is followed by three first residual layers (Resblock) sequentially connected in series. An average pooling layer (Avg-pooling) is connected between the adjacent first residual layers. The first residual layer is followed by three second residual layers sequentially connected in series, and an up-sampling module (Up-sampling) is connected between the adjacent second residual layers. The second residual layer is followed by two second convolution layers (i.e., Conv(3,64,1) and Conv(3,1,1)) sequentially connected in series. The last convolution layer outputs the final prediction residual $r'_t$ to be coded.

In some embodiments, the method further includes the following operations. First category identification information is preset for the first network model and for the second network model. The first category identification information is used for indicating an operating mode of the second network model, or, the first category identification information is used for indicating operating modes of the first network model and the second network model. In response to the first category identification information indicating a first operating mode, the second information to be coded is determined according to the first information to be coded, the first information to be coded is equal to the second information to be coded, and network rate-distortion performance measurement is performed to obtain a third measurement result. In response to the first category identification information indicating a second operating mode, the first relevant information to be coded of the current coding unit is filtered by using the preset network model and the side information to obtain the second relevant information to be coded, and the network rate-distortion performance measurement is performed to obtain a fourth measurement result. A rate-distortion decision is made based on the third measurement result and the fourth measurement result, and target first category identification information and target second category identification information corresponding to a target measurement result that represents an optimal rate-distortion performance are determined.

It should be noted that the first category identification information is used for indicating operating modes of the first network model and the second network model. Both the first network model and the second network model operate in the same operating mode, and the operating mode includes a first operating mode and a second operating mode. The first information to be coded being equal to the second information to be coded may be understood as that the preset network model (including the first network model and the second network model) is not used to perform filtering on the first information to be coded at the encoding end network. The first operating mode is equivalent to that the preset network model is disabled. In the second operating mode, the first relevant information to be coded of the current coding unit is filtered by using the preset network model and the side information, to obtain the second relevant information to be coded and further to obtain the second information to be coded, which may be understood as that the preset network model is used to perform filtering on the first information to be coded at the encoding end network. The second operating mode is equivalent to that the preset network model is enabled.

The rate-distortion decision is used for determining the optimal rate-distortion performance, and the operating mode of the preset network model is determined according to the optimal rate-distortion performance. According to the embodiments of the disclosure, the rate-distortion decision is made to decide whether to use a preset network model, and the determined first category identification information is written into a header of the bitstream to be transmitted to the decoding end. In order to cooperate with the operations at the encoding end, reverse processing is required to be performed at the decoding end after the decoding network at the same time. Therefore, the preset network model is used or not used at both the encoding end and the decoding end. In practical applications, when various categories of side information are input into the preset network model, the optimal side information category for the preset network model may be selected through the rate-distortion decision.

In some embodiments, the method further includes the following operations. Second category identification information is preset for the first network model and the second network model, and the second category identification information is used for indicating a category of input side information. The first relevant information to be coded of the current coding unit is filtered by using the preset network model and the side information to obtain the second relevant information to be coded, and the network rate-distortion performance measurement is performed to obtain at least one fourth measurement result.

Correspondingly, the operation that the rate-distortion decision is made based on the third measurement result and the fourth measurement result, to determine the target first category identification information corresponding to the target measurement result that represents the optimal rate-distortion performance includes the following operation. The rate-distortion decision is made based on the third measurement result and the at least one fourth measurement result, and the target first category identification information and target second category identification information corresponding to the target measurement result that represents the optimal rate-distortion performance are determined.

It should be noted that the first category identification information is used for indicating an operating mode of the preset network model, and the operating mode includes the first operating mode and the second operating mode. The first information to be coded being equal to the second information to be coded may be understood as that the preset network model is not used to perform filtering on the first information to be coded at the encoding end network. The first operating mode is equivalent to that the preset network model is disabled. In the second operating mode, the first relevant information to be coded of the current coding unit is filtered by using the preset network model and the side information, to obtain the second relevant information to be coded and further to obtain the second information to be coded, which may be understood as that the preset network model is used to perform filtering on the first information to be coded at the encoding end network. The second operating mode is equivalent to that the first network model is enabled.

The second category identification information is used for indicating at least one category of input side information. When the preset network model is in the second operating mode, the preset network model may be divided into multiple types of network models according to different categories of the input side information. The rate-distortion decision is used for determining the optimal rate-distortion performance, and the side information category that is input in the first network model under the second operating mode is determined according to the optimal rate-distortion performance. According to the embodiments of the disclosure, the rate-distortion decision is made to decide whether to use a preset network model and which side information to be used as the input. The determined first category identification information and second category identification information are written into the header of the bitstream to be transmitted to the decoding end. In order to cooperate with the operations at the encoding end, reverse processing is required to be performed at the decoding end after the decoding network at the same time. Therefore, the preset network model is used at both the encoding end and the decoding end, and the side information category input into the network model that is indicated by the second category identification information at the encoding end is the same as that at the decoding end.

In practical applications, by instructing a switch to be on and off, the first category identification information and the second category identification information indicate whether to use the preset network model and which side information to be used as the input. That is, a switch may be set at an intersection of the preset network model and the backbone network, and is controlled to be on and off to select whether to use the preset network model. Moreover, a switch may be set at the input end for the side information of the preset network model, and is controlled to be on and off to select whether to input the corresponding side information into the preset network model.

In the embodiments of the disclosure, the first network model and the second network model are obtained by model training. In some embodiments, the model training may specifically include the following operations.

A first training sample set is obtained. The first training sample set includes one or more sample pictures. An initial network model is constructed, and the first training sample set is input into the initial network model for training the initial network model. In response to a loss value of a loss function being greater than a loss threshold, parameters of the initial network model are adjusted until the loss value is less than the loss threshold, to obtain a trained network model. The trained network model is taken as the first network model.

A second training sample set is obtained. The second training sample set includes one or more sample pictures. The second training sample set is input into the initial network model for training the initial network model. In response to a loss value of a loss function being greater than a loss threshold, parameters of the initial network model are adjusted until the loss value is less than the loss threshold, to obtain a trained network model. The trained network model is taken as the second network model.

It should be noted that the first training sample set and the second training sample set may be the same, or may be different from each other. The training sample set may include one or more pictures. The training sample set may be a training sample set stored locally by the encoder, a training sample set obtained from a remote server according to a link or address information, or even a decoded picture sample set in a video, which is not specifically limited in the embodiments of the disclosure.

In this way, after obtaining the training sample set, the initial network model may be trained by using the training sample set through a cost function. When the loss value (Loss) of the cost function converges to a certain preset threshold, the trained initial network model is the preset network model. The cost function may be a rate-distortion cost function, and the preset threshold may be specifically set according to the actual situation, which is not limited in the embodiments of the disclosure.

It is also to be noted that, for determining the preset network model, network model parameters in the preset network model may be determined firstly. In some embodiments, the operation that the preset network model is determined may include the following operations. The network model parameters are determined. The preset network model is constructed according to the determined network model parameters.

In the embodiments of the disclosure, the network model parameters may be determined by model training. Specifically, in some embodiments, determination of the network model parameters may include the following operations. A training sample set is obtained. An initial network model is constructed, and the initial network model includes model parameters. The initial network model is trained by using the training sample set, and the model parameters in the trained initial network model are determined as the network model parameters.

In such case, at the encoding end, after the network model parameters are obtained by the model training, the network model parameters may be written into the bitstream. In this way, at the decoding end, the network model parameters are obtained directly by decoding the bitstream, and the preset network model is constructed without the model training at the decoding end.

Examples of types of the side information input to the first network model and the second network model are described below. The two added depths may be other side information according to the network input, such as, one or more reference reconstructed units $\hat{x}_{t-1}$ ($\hat{x}_{t-2}$, $\hat{x}_{t-3}$, $\hat{x}_{t-4}$ and the like), one or more reconstructed motion information $\hat{v}_t$ ($\hat{v}_{t-1}$, $\hat{v}_{t-2}$, $\hat{v}_{t-3}$ and the like), a picture $w(\hat{x}_{t-1}, \hat{v}_t)$ ($w(\hat{x}_{t-2}, \hat{v}_t)$ and the like) obtained by performing a warped operation on $\overline{v}_t$ and the reconstructed unit $\hat{x}_{t-1}$($\hat{x}_{t-2}$, $\hat{x}_{t-3}$, $\hat{x}_{t-4}$ and the like), a prediction unit $\hat{x}_t$, and so on.

Figure 8:
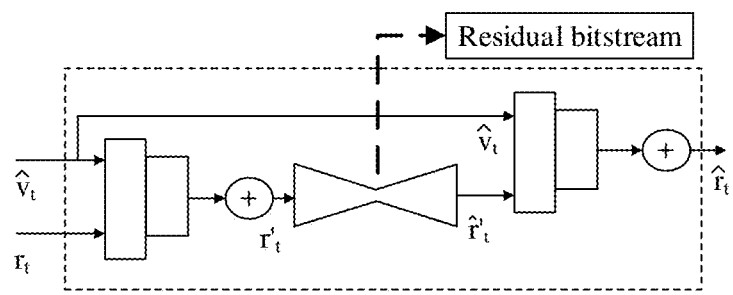
FIG. 8 illustrates a schematic diagram of a third partial structure of an encoding end network in an embodiment of the disclosure.

FIG. 8 illustrates a schematic diagram of a third partial structure of an encoding end network in an embodiment of the disclosure. As illustrated in FIG. 8, taking the first information to be coded to be residual information as an example, the side information is decoded motion information $\hat{v}_t$ of the current coding unit (at the encoding end, $\hat{v}_t$ is decoded from the MV autocodec network 32; at the decoding end, $\hat{v}_t$ is decoded by using the MV decoding network after the MV bitstream is obtained).

The input for the second network model also includes a residual $r_t$. According to the correlation between the motion information and the residual, the second network model effectively makes the output $r'_t$ to carry less information than the original residual $r_t$ (by removing the common part between the motion information and the residual information). Therefore, after entering the picture autocodec, the bitstream with a lower bitrate can be obtained under the same distortion, thereby effectively improving the efficiency for encoding information.

The input for the first network model also includes the output $\hat{r}'_t$ from the residual autocodec network 35. In the output $\hat{r}_t$ after passing through the first network model, the common part between the motion information and the residual information is supplemented. The output carries more information than the output $\hat{r}'_t$, which makes the final reconstructed picture to be closer to the original coded picture.

Figure 9:
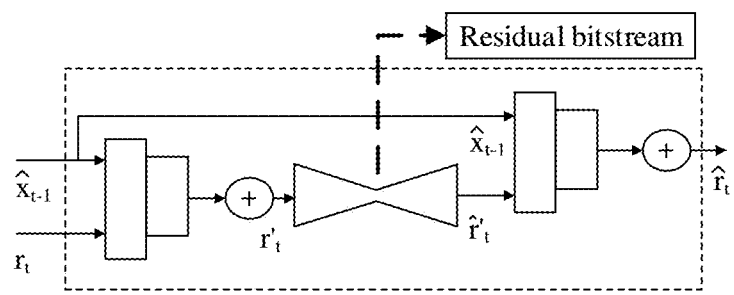
FIG. 9 illustrates a schematic diagram of a fourth partial structure of an encoding end network in an embodiment of the disclosure.

FIG. 9 illustrates a schematic diagram of a fourth partial structure of an encoding end network in an embodiment of the disclosure. As illustrated in FIG. 9, the side information is a previous reconstructed unit $\hat{x}_{t-1}$.

Figure 10:
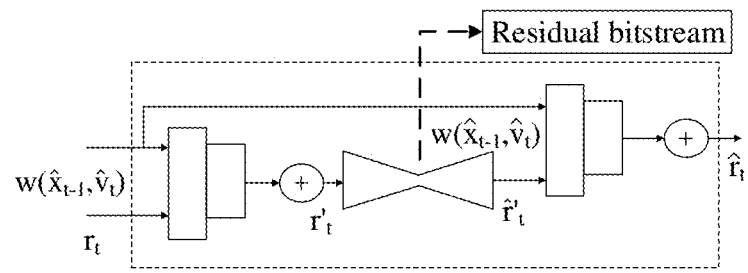
FIG. 10 illustrates a schematic diagram of a fifth partial structure of an encoding end network in an embodiment of the disclosure.

FIG. 10 illustrates a schematic diagram of a fifth partial structure of an encoding end network in an embodiment of the disclosure. As illustrated in FIG. 10, the side information is distortion information $w(\hat{x}_{t-1}, \hat{v}_t)$ of $\hat{v}_t$ and $\hat{x}_{t-1}$.

Figure 11:
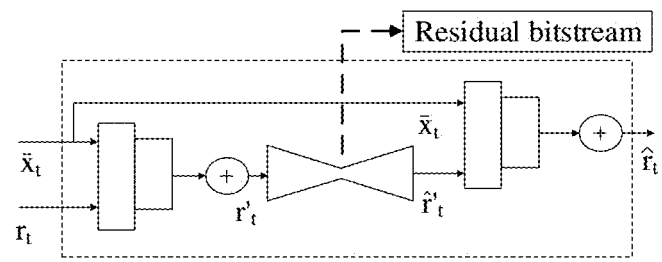
FIG. 11 illustrates a schematic diagram of a sixth partial structure of an encoding end network in an embodiment of the disclosure.

FIG. 11 illustrates a schematic diagram of a sixth partial structure of an encoding end network in an embodiment of the disclosure. As illustrated in FIG. 11, the side information is a prediction unit $\overline{x}_t$. It is to be noted that if the first information to be coded is motion information, the side information cannot be the prediction unit $\overline{x}_t$.

Figure 12:
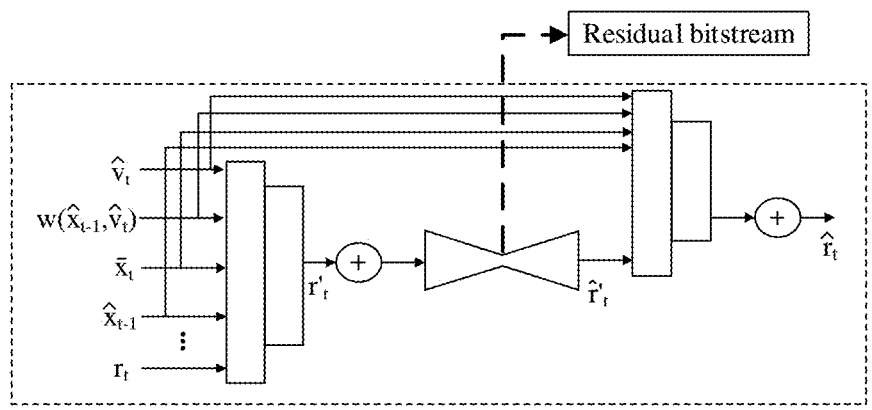
FIG. 12 illustrates a schematic diagram of a seventh partial structure of an encoding end network in an embodiment of the disclosure.
Figure 13:
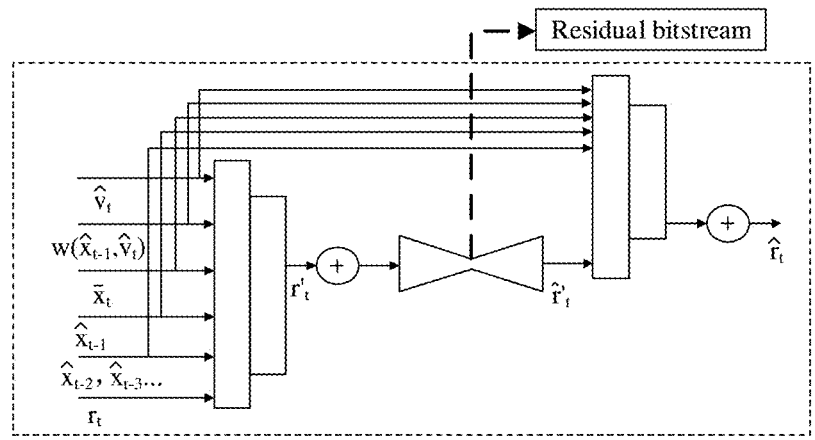
FIG. 13 illustrates a schematic diagram of an eighth partial structure of an encoding end network in an embodiment of the disclosure.

The side information may include various types of side information. FIG. 12 illustrates a schematic diagram of a seventh partial structure of an encoding end network in an embodiment of the disclosure. As illustrated in FIG. 12, the side information includes $\hat{v}_t$, $w(\hat{x}_{t-1}, \hat{v}_t)$, $\overline{x}_t$ and $\hat{x}_{t-1}$ and so on. FIG. 13 illustrates a schematic diagram of an eighth partial structure of an encoding end network in an embodiment of the disclosure. As illustrated in FIG. 13, the side information includes $\hat{v}_t$, $w(\hat{x}_{t-1}, \hat{v}_t)$, $\overline{x}_t$, $\hat{x}_{t-1}$, $\hat{x}_{t-2}$, $\hat{x}_{t-3}$ and so on.

With the aforementioned technical solutions, during the coding process, the known side information having a correlation with the current coding unit and the preset network model are used for performing filtering on the relevant information to be coded, thereby improving the coding efficiency of the data to be coded.

Embodiments of the disclosure further illustrate the method for encoding the video.

In other embodiments, the preset network model includes a first network model. The first relevant information to be coded includes first decoding information, and the second relevant information to be coded includes second decoding information. The first network model is used for performing enhancement and filtering on the decoded information at the encoding end, such that the enhanced prediction value is closer to a real value. Thus, the prediction accuracy can be effectively improved, and the coding efficiency of the subsequent information to be coded can be further improved. Part of input ends of the first network model are shorted to the output end. That is, part of the input ends are connected to the output end to form a semi-residual network model. Such semi-residual network model is easy to be trained and applied, and can be trained faster with higher learning efficiency and better filtering effect than a non-shorted network model.

In some embodiments, an input end for the first decoding information in the first network model is shorted to the output end.

Figure 14:
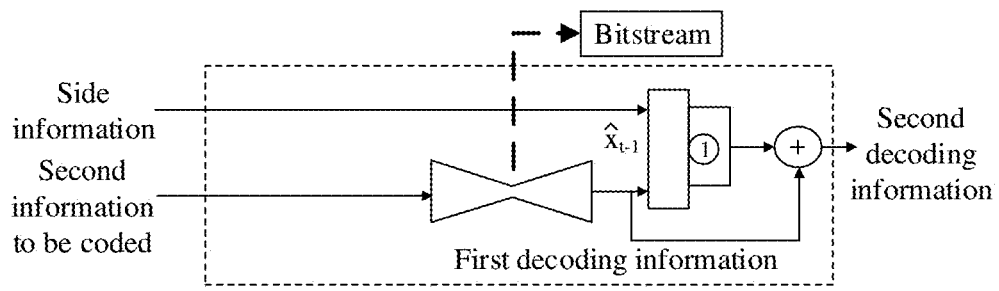
FIG. 14 illustrates a schematic diagram of a ninth partial structure of an encoding end network in an embodiment of the disclosure.

FIG. 14 illustrates a schematic diagram of a ninth partial structure of an encoding end network in an embodiment of the disclosure. As illustrated in FIG. 14, when the preset network model only includes the first network model ①, the first network model may be added after the MV autocodec network 32 and/or the residual autocodec network 35 in FIG. 3, and the input end for the first decoding information in the first network model is shorted to the output end.

In practical applications, after the bitstream is obtained, the method further includes the following operations. The bitstream is input into the decoding network for decoding, to output the first decoding information. The first decoding information and the side information are input into the first network model, to output the second decoding information. The first network model is used for performing filtering on the first decoding information according to a correlation between the first decoding information and the side information.

That is, the first network model is located after the decoding network, and is used for performing enhancement on the decoding information. It is to be understood that the first network model implements the filtering processing on the first information to be coded by performing enhancement on the decoding information. With enhancement of the decoding information, for the whole network at the encoding end, using the enhanced decoding information for encoding may also achieve the purpose of reducing the redundancy of the information to be coded.

In some embodiments, the first network model includes at least a first neural network model and a first adder.

Correspondingly, the operation that the first decoding information and the side information are input into the first network model to output the second decoding information includes the following operations. The first decoding information and the side information are input into the first neural network model to output a first intermediate value. The first intermediate value is added by the first adder to the first decoding information, to obtain the second decoding information.

The first neural network model includes a convolution layer(s), a residual layer(s), an average pooling layer(s) and a sampling rate conversion module(s).

In some embodiments, the first neural network model includes a first convolution layer, at least one second convolution layer, first residual layers, second residual layers, average pooling layers, and sampling rate conversion modules. The first convolution layer is followed by at least two first residual layers connected in series, and an average pooling layer is connected between the adjacent first residual layers. At least one of the first residual layers is followed by at least two second residual layers connected in series, and a sampling rate conversion module is connected between the adjacent second residual layers. At least one of the second residual layers is connected in series with the at least one second convolution layer.

Specifically, the first decoding information and the side information are input into a connection layer. The connection layer is followed by one first convolution layer. The first convolution layer is followed by at least two first residual layers connected in series, and one average pooling layer is connected between the adjacent first residual layers. At least one of the first residual layers is followed by at least two second residual layers connected in series, and one sampling rate conversion module is connected between the adjacent second residual layers. At least one of the second residual layers is followed by two second convolution layers connected in series. Two input ends of the first adder are respectively connected to the input end for the first decoding information and an input end of the last second convolution layer, and an output end of the first adder is taken as the output end of the first network model.

It should be noted that the connection layer is used for concatenating the side information and the first decoding information and inputting the information into the next layer. The first convolution layer is used for extracting features from the input information and inputting the extracted features into the next layer. The average pooling layer is used for performing downsampling to reduce dimension, removing redundant information, compressing the features, simplifying network complexity, reducing computation, reducing memory consumption and so on. The sampling rate conversion module is used for performing upsampling or downsampling on the input information, and the second convolution layer is also used for extracting features from the input information. The adder is used to add the first decoding information and the output information of the last second convolution layer, to output the second decoding information.

In some embodiments, the method further includes the following operations, First category identification information is preset for the first network model, and the first category identification information is used for indicating an operating mode of the first network model. In response to the first category identification information indicating a first operating mode, the first relevant information to be coded is equal to the second relevant information to be coded, and network rate-distortion performance measurement is performed to obtain a first measurement result. In response to the first category identification information indicating a second operating mode, the first relevant information to be coded of the current coding unit is filtered by using the preset network model and the side information to obtain the second relevant information to be coded, and the network rate-distortion performance measurement is performed to obtain a second measurement result. A rate-distortion decision is made based on the first measurement result and the second measurement result, and target first category identification information corresponding to a target measurement result that represents an optimal rate-distortion performance is determined.

It should be noted that the first category identification information is used for indicating an operating mode of the first network model, and the operating mode includes the first operating mode and the second operating mode. The first information to be coded being equal to the second information to be coded may be understood as that the first network model is not used to perform filtering on the first information to be coded at the encoding end network, but the first information to be coded is directly input into the autocodec. The first operating mode is equivalent to that the first network model is disabled. In the second operating mode, the first relevant information to be coded of the current coding unit is filtered by using the preset network model and the side information, to obtain the second relevant information to be coded and further to obtain the second information to be coded, which may be understood as that the first network model is used to perform filtering on the first information to be coded at the encoding end network. The second operating mode is equivalent to that the first network model is enabled.

The rate-distortion decision is used for determining the optimal rate-distortion performance, and the operating mode of the first network model is determined according to the optimal rate-distortion performance. According to the embodiments of the disclosure, the rate-distortion decision is made to decide whether to use a preset network model, and the determined first category identification information is written into a header of the bitstream to be transmitted to the decoding end. In order to cooperate with the operations at the encoding end, reverse processing is required to be performed at the decoding end after the decoding network at the same time. Therefore, the preset network model is used or not used at both the encoding end and the decoding end. In practical applications, when various categories of side information are input into the first network model, the optimal side information category for the first network model may be selected through the rate-distortion decision.

In some embodiments, the method further includes the following operations. Second category identification information is preset for the first network model, and the second category identification information is used for indicating a category of input side information. In response to the first category identification information indicating the second operating mode, the second category identification information indicates at least one category of input side information, the first relevant information to be coded of the current coding unit is filtered by using the preset network model and the side information to obtain the second relevant information to be coded, and the network rate-distortion performance measurement is performed to obtain at least one second measurement result.

Correspondingly, the operation that the rate-distortion decision is made based on the first measurement result and the second measurement result, to determine the target first category identification information corresponding to the target measurement result that represents the optimal rate-distortion performance includes the following operation. The rate-distortion decision is made based on the first measurement result and the at least one second measurement result, and the target first category identification information and target second category identification information corresponding to the target measurement result that represents the optimal rate-distortion performance are determined.

It should be noted that the first category identification information is used for indicating an operating mode of the first network model, and the operating mode includes the first operating mode and the second operating mode. The first information to be coded being equal to the second information to be coded may be understood as that the first network model is not used to perform filtering on the first information to be coded at the encoding end network. The first operating mode is equivalent to that the first network model is disabled. In the second operating mode, the first relevant information to be coded of the current coding unit is filtered by using the preset network model and the side information, to obtain the second relevant information to be coded and further to obtain the second information to be coded, which may be understood as that the first network model is used to perform filtering on the first information to be coded at the encoding end network. The second operating mode is equivalent to that the first network model is enabled.

The second category identification information is used for indicating at least one category of input side information. When the first network model is in the second operating mode, the first network model may be divided into multiple types of network models according to different categories of the input side information. The rate-distortion decision is used for determining the optimal rate-distortion performance, and the side information category that is input in the first network model under the second operating mode is determined according to the optimal rate-distortion performance. According to the embodiments of the disclosure, the rate-distortion decision is made to decide whether to use a preset network model and which side information to be used as the input. The determined first category identification information and second category identification information are written into the header of the bitstream to be transmitted to the decoding end. In order to cooperate with the operations at the encoding end, reverse processing is required to be performed at the decoding end after the decoding network at the same time. Therefore, the preset network model is used at both the encoding end and the decoding end, and the side information category input into the network model that is indicated by the second category identification information at the encoding end is the same as that at the decoding end.

In practical applications, by instructing a switch to be on and off, the first category identification information and the second category identification information indicate whether to use the preset network model and which side information to be used as the input. That is, a switch may be set at an intersection of the preset network model and the backbone network, and is controlled to be on and off to select whether to use the preset network model. Moreover, a switch may be set at the input end for the side information of the preset network model, and is controlled to be on and off to select whether to input the corresponding side information into the preset network model.

In other embodiments, the preset network model may include a first network model and a second network model. The first relevant information to be coded includes first decoding information, the second relevant information to be coded includes second decoding information, the first relevant information to be coded further includes the first information to be coded, and the second relevant information to be coded further includes second information to be coded. Part of input ends of the first network model and part of input ends of the second network model are shorted to an output end. That is, part of the input ends are connected to the output end to form a semi-residual network model. Such semi-residual network model is easy to be trained and applied, and can be trained faster with higher learning efficiency and better filtering effect than a non-shorted network model.

In some embodiments, an input end for the first decoding information in the first network model is shorted to the output end of the first network model. An input end for the first information to be coded in the second network model is shorted to the output end of the second network model.

Figure 15:
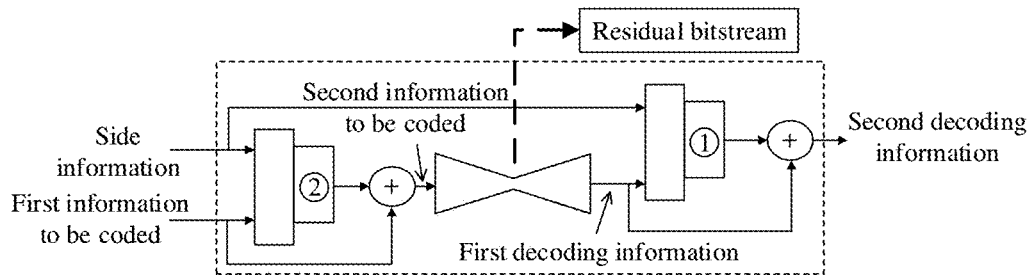
FIG. 15 illustrates a schematic diagram of a tenth partial structure of an encoding end network in an embodiment of the disclosure.

FIG. 15 illustrates a schematic diagram of a tenth partial structure of an encoding end network in an embodiment of the disclosure. As illustrated in FIG. 15, when the preset network model includes the first network model ① and the second network model ②, the first network model may be added after the MV autocodec network 32 and/or the residual autocodec network 35 in FIG. 3, and the input end for the first decoding information in the first network model is be shorted to the output end of the first network model. The second network model may be added before the MV autocodec network 32 and/or the residual autocodec network 35 in FIG. 3, and the input end for the first information to be coded in the second network model is shorted to the output end of the second network model.

In some embodiments, the first network model includes at least a first neural network model and a first adder.

Correspondingly, the operation that the first decoding information and the side information are input into the first network model to output the second decoding information includes the following operations. The first decoding information and the side information are input into the first neural network model to output a first intermediate value. The first intermediate value is added by the first adder to the first decoding information, to obtain the second decoding information.

The first neural network model includes a convolution layer, a residual layer, an average pooling layer and a sampling rate conversion module.

In some embodiments, the first neural network model includes a first convolution layer, at least one second convolution layer, first residual layers, second residual layers, an average pooling layer, and a sampling rate conversion module. The first convolution layer is followed by at least two first residual layers connected in series, and an average pooling layer is connected between the adjacent first residual layers. At least one of the first residual layers is followed by at least two second residual layers connected in series, and a sampling rate conversion module is connected between the adjacent second residual layers. At least one of the second residual layers is connected in series with the at least one second convolution layer.

Specifically, the first decoding information and the side information are input into a connection layer. The connection layer is followed by one first convolution layer. The first convolution layer is followed by at least two first residual layers connected in series, and one average pooling layer is connected between the adjacent first residual layers. At least one of the first residual layers is followed by at least two second residual layers connected in series, and one sampling rate conversion module is connected between the adjacent second residual layers. At least one of the second residual layers is followed by two second convolution layers connected in series. Two input ends of the first adder are respectively connected to the input end for the first decoding information and an input end of the last second convolution layer, and an output end of the first adder is taken as the output end of the first network model.

In some embodiments, the second network model includes at least a second neural network model and a second adder.

Correspondingly, the first information to be coded and the side information are input into the second network model to output a second intermediate value. The second intermediate value is added by the second adder to the first information to be coded, to obtain the second information to be coded.

Specifically, the first information to be coded and the side information are input into a connection layer. The connection layer is followed by one first convolution layer. The first convolution layer is followed by at least two first residual layers connected in series, and one average pooling layer is connected between the adjacent first residual layers. At least one of the first residual layers is followed by at least two second residual layers connected in series, and one sampling rate conversion module is connected between the adjacent second residual layers. At least one of the second residual layers is followed by two second convolution layers connected in series. Two input ends of the second adder are respectively connected to the input end for the first information to be coded and an input end of the last second convolution layer, and an output end of the second adder is taken as the output end of the second network model.

It should be noted that the connection layer is used for concatenating the input side information and first decoding information and inputting the information into the next layer. The first convolution layer is used for extracting features from the input information and inputting the extracted features into the next layer. The average pooling layer is used for performing downsampling to reduce dimension, removing redundant information, compressing the features, simplifying network complexity, reducing computation, reducing memory consumption and so on. The sampling rate conversion module is used for performing upsampling or downsampling on the input information, and the second convolution layer is also used for extracting features from the input information.

Figure 16:
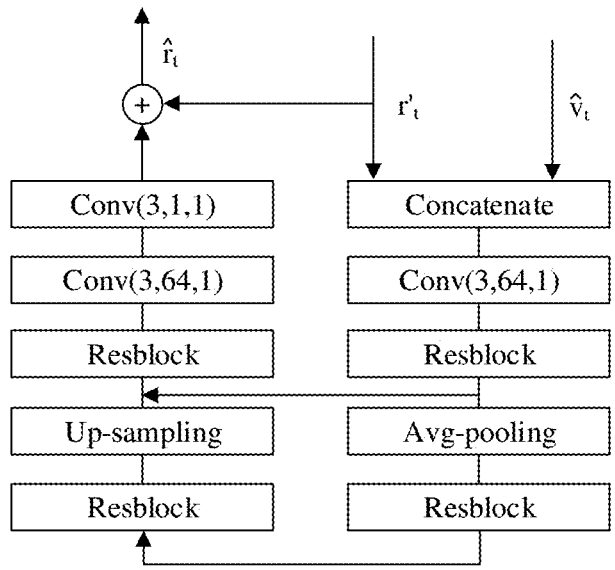
FIG. 16 illustrates a second structure diagram of a first network model in an embodiment of the disclosure.

FIG. 16 illustrates a second structure diagram of a first network model in an embodiment of the disclosure. As illustrated in FIG. 16, taking the first information to be coded to be residual information as an example, the prediction residual $r'_t$ directly output from the residual autocodec network 35 and the side information $\hat{v}_t$ are input into a connection layer (Concatenate). The connection layer is followed by a convolution layer (Conv(3,64,1)). The convolution layer is followed by two first residual layers (Resblock) sequentially connected in series, and an average pooling layer (Avg-pooling) is connected between the adjacent first residual layers. The first residual layer is followed by two second residual layers sequentially connected in series, and an up-sampling module (Up-sampling) is connected between the adjacent second residual layers. The second residual layer is followed by two second convolution layers (i.e., Conv(3,64,1) and Conv(3,1,1)) sequentially connected in series. The input end for $r'_t$ is shorted by the adder to the output end, and the adder outputs the final prediction residual $\hat{r}_t$. The number of the first residual layers is equal to the number of the second residual layers, and the information output from the first residual layer is also input into a second residual layer corresponding to the first residual layer.

Figure 17:
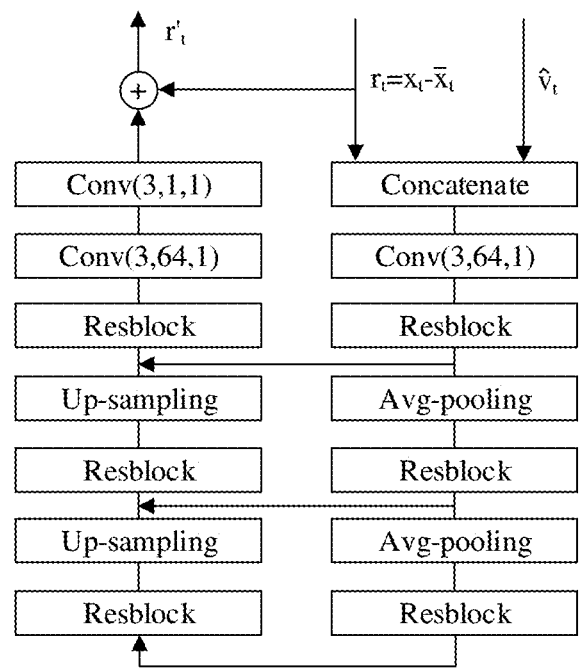
FIG. 17 illustrates a second structure diagram of a second network model in an embodiment of the disclosure.

FIG. 17 illustrates a second structure diagram of a second network model in an embodiment of the disclosure. As illustrated in FIG. 17, taking the first information to be coded to be residual information as an example, the prediction residual $r_t = x_t - \bar{x}_t$ obtained before the residual autocodec network 35 and the side information $\hat{v}_t$ are input into a connection layer (Concatenate). The connection layer is followed by a convolution layer (Conv(3,64,1)), and the convolution layer is followed by three first residual layers (Resblock) sequentially connected in series. An average pooling layer (Avg-pooling) is connected between the adjacent first residual layers. The first residual layer is followed by three second residual layers sequentially connected in series, and an up-sampling module (Up-sampling) is connected between the adjacent second residual layers. The second residual layer is followed by two second convolution layers (i.e., Conv(3,64,1) and Conv(3,1,1)) sequentially connected in series. The input end for $r_t$ is shorted by the adder to the output end, and the adder outputs the final prediction residual $r'_t$ to be coded.

In some embodiments, the method further includes the following operations. First category identification information is preset for the first network model and for the second network model. The first category identification information is used for indicating an operating mode of the second network model, or, the first category identification information is used for indicating operating modes of the first network model and the second network model. In response to the first category identification information indicating a first operating mode, the first information to be coded is determined according to the second information to be coded, the first information to be coded is equal to the second information to be coded, and network rate-distortion performance measurement is performed to obtain a third measurement result. In response to the first category identification information indicating a second operating mode, the first relevant information to be coded of the current coding unit is filtered by using the preset network model and the side information to obtain the second relevant information to be coded, and the network rate-distortion performance measurement is performed to obtain a fourth measurement result. A rate-distortion decision is made based on the third measurement result and the fourth measurement result, and target first category identification information and target second category identification information corresponding to a target measurement result that represents an optimal rate-distortion performance are determined.

It should be noted that the first category identification information is used for indicating operating modes of the first network model and the second network model. Both the first network model and the second network model operate in the same operating mode, and the operating mode includes a first operating mode and a second operating mode. In the first operating mode, the first information to be coded being equal to the second information to be coded may be understood as that the preset network model (including the first network model and the second network model) is not used to perform filtering on the first information to be coded at the encoding end network. The first operating mode is equivalent to that the preset network model is disabled. In the second operating mode, the first relevant information to be coded of the current coding unit is filtered by using the preset network model and the side information, to obtain the second relevant information to be coded and further to obtain the second information to be coded, which may be understood as that the preset network model is used to perform filtering on the first information to be coded at the encoding end network. The second operating mode is equivalent to that the preset network model is enabled.

The rate-distortion decision is used for determining the optimal rate-distortion performance, and the operating mode of the preset network model is determined according to the optimal rate-distortion performance. According to the embodiments of the disclosure, the rate-distortion decision is made to decide whether to use a preset network model, and the determined first category identification information is written into a header of the bitstream to be transmitted to the decoding end. In order to cooperate with the operations at the encoding end, reverse processing is required to be performed at the decoding end after the decoding network at the same time. Therefore, the preset network model is used or not used at both the encoding end and the decoding end. In practical applications, when various categories of side information are input into the preset network model, the optimal side information category for the preset network model may be selected through the rate-distortion decision.

In some embodiments, the method further includes the following operations. Second category identification information is preset for the first network model and the second network model, and the second category identification information is used for indicating a category of input side information. In response to the first category identification information indicating the second operating mode, the second category identification information indicates at least one category of input side information, the first relevant information to be coded of the current coding unit is filtered by using the preset network model and the side information to obtain the second relevant information to be coded and further to obtain the second information to be coded, and the network rate-distortion performance measurement is performed to obtain at least one fourth measurement result.

Correspondingly, the operation that the rate-distortion decision is made based on the third measurement result and the fourth measurement result, to determine the target first category identification information corresponding to the target measurement result that represents the optimal rate-distortion performance includes the following operation. The rate-distortion decision is made based on the third measurement result and the at least one fourth measurement result, and the target first category identification information and target second category identification information corresponding to the target measurement result that represents the optimal rate-distortion performance are determined.

It should be noted that the first category identification information is used for indicating an operating mode of the preset network model, and the operating mode includes the first operating mode and the second operating mode. The first information to be coded being equal to the second information to be coded may be understood as that the preset network model is not used to perform filtering on the first information to be coded at the encoding end network. The first operating mode is equivalent to that the preset network model is disabled. In the second operating mode, the first relevant information to be coded of the current coding unit is filtered by using the preset network model and the side information, to obtain the second relevant information to be coded and further to obtain the second information to be coded, which may be understood as that the preset network model is used to perform filtering on the first information to be coded at the encoding end network. The second operating mode is equivalent to that the first network model is enabled.

The second category identification information is used for indicating at least one category of input side information. When the preset network model is in the second operating mode, the preset network model may be divided into multiple types of network models according to different categories of the input side information. The rate-distortion decision is used for determining the optimal rate-distortion performance, and the side information category that is input in the first network model under the second operating mode is determined according to the optimal rate-distortion performance. According to the embodiments of the disclosure, the rate-distortion decision is made to decide whether to use a preset network model and which side information to be used as the input. The determined first category identification information and second category identification information are written into the header of the bitstream to be transmitted to the decoding end. In order to cooperate with the operations at the encoding end, reverse processing is required to be performed at the decoding end after the decoding network at the same time. Therefore, the preset network model is used at both the encoding end and the decoding end, and the side information category input into the network model that is indicated by the second category identification information at the encoding end is the same as that at the decoding end.

In practical applications, by instructing a switch to be on and off, the first category identification information and the second category identification information indicate whether to use the preset network model and which side information to be used as the input. That is, a switch may be set at an intersection of the preset network model and the backbone network, and is controlled to be on and off to select whether to use the preset network model. Moreover, a switch may be set at the input end for the side information of the preset network model, and is controlled to be on and off to select whether to input the corresponding side information into the preset network model.

In the embodiments of the disclosure, the first network model and the second network model are obtained by model training. In some embodiments, the model training may specifically include the following operations.

A first training sample set is obtained. The first training sample set includes one or more sample pictures. An initial network model is constructed, and the first training sample set is input into the initial network model for model training. In response to a loss value of a loss function being greater than a loss threshold, parameters of the initial network model are adjusted until the loss value is less than the loss threshold, to obtain a trained network model. The trained network model is taken as the first network model.

A second training sample set is obtained. The second training sample set includes one or more sample pictures. The second training sample set is input into the initial network model for model training. In response to a loss value of a loss function being greater than a loss threshold, parameters of the initial network model are adjusted until the loss value is less than the loss threshold, to obtain a trained network model. The trained network model is taken as the second network model.

It should be noted that the first training sample set and the second training sample set may be the same, or may be different from each other. The training sample set may include one or more pictures. The training sample set may be a training sample set stored locally by the encoder, a training sample set obtained from a remote server according to a link or address information, or even a decoded picture sample set in a video, which is not specifically limited in the embodiments of the disclosure.

In this way, after obtaining the training sample set, the initial network model may be trained by using the training sample set through a cost function. When the loss value (Loss) of the cost function converges to a certain preset threshold, the trained initial network model is the preset network model. The cost function may be a rate-distortion cost function, and the preset threshold may be specifically set according to the actual situation, which is not limited in the embodiments of the disclosure.

It is also to be noted that, for determining the preset network model, the network model parameters in the preset network model may be determined firstly. In some embodiments, the operation that the preset network model is determined may include the following operations. One or more network model parameters are determined. The preset network model is constructed according to the determined network model parameters.

In the embodiments of the disclosure, the network model parameters may be determined by model training Specifically, in some embodiments, the model training may include the following operations. A training sample set is obtained. An initial network model is constructed, and the initial network model includes model parameters. The initial network model is trained by using the training sample set, and the model parameters in the trained initial network model are determined as the network model parameters.

In such case, at the encoding end, after the network model parameters by the model training are obtained, the network model parameters may be written into the bitstream. In this way, at the decoding end, the network model parameters is obtained directly by decoding the bitstream, and the preset network model is constructed without the model training at the decoding end.

Examples of types of the side information input to the first network model and the second network model are described below. The two added depths may be other side information according to the network input, such as, one or more reference reconstructed units $\hat{x}_{t-1}(\hat{x}_{t-2}, \hat{x}_{t-3}, \hat{x}_{t-4}$ and the like), one or more reconstructed motion information $\hat{v}_t$ ($\hat{v}_{t-1}, \hat{v}_{t-2}, \hat{v}_{t-3}$ and the like), a picture $w(\hat{x}_{t-1}, \hat{v}_t)$ ($w(\hat{x}_{t-2}, \hat{v}_t)$ and the like) obtained by performing a warped operation on $\hat{v}_t$ and the reconstructed unit $\hat{x}_{t-1}(\hat{x}_{t-2}, \hat{x}_{t-3}, \hat{x}_{t-4}$ and the like), a prediction unit $\bar{x}_t$, and so on.

Figure 18:
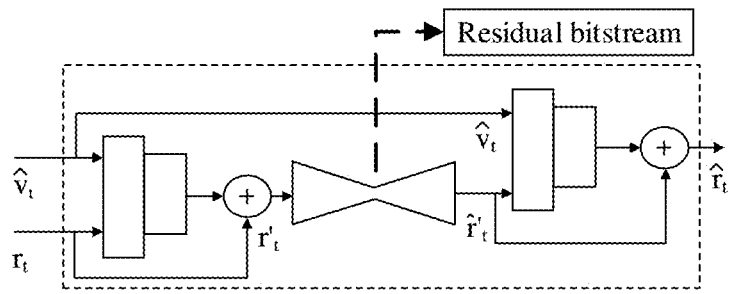
FIG. 18 illustrates a schematic diagram of an eleventh partial structure of an encoding end network in an embodiment of the disclosure.

FIG. 18 illustrates a schematic diagram of an eleventh partial structure of an encoding end network in an embodiment of the disclosure. As illustrated in FIG. 18, taking the first information to be coded to be residual information as an example, the side information is decoded motion information $\hat{v}_t$ of the current coding unit (at the encoding end, $\hat{v}_t$ is decoded from the MV autocodec network 32; at the decoding end, $\hat{v}_t$ is decoded by using the MV decoding network after the MV bitstream is obtained)).

The input for the second network model also includes a residual $r_t$. The second network model uses the correlation between the motion information and the residual, and connects one input for $r_t$ to the output of the network, to effectively make the output $r'_t$ to carry less information than the original residual $r_t$ (by removing the common part between the motion information and the residual information). Therefore, after entering the picture autocodec, the bitstream with a lower bitrate can be obtained under the same distortion, thereby effectively improving the efficiency for encoding information.

The input for the first network model also includes the output $\hat{r}'_t$ from the residual autocodec network 35, and one input for $\hat{r}'_t$ of the network is connected to the output of the network. In the output $\hat{r}_t$ after passing through the first network model, the common part between the motion information and the residual information is supplemented. Thus, the output $\hat{r}_t$ carries more information than the output $\hat{r}'_t$, which makes the final reconstructed picture to be closer to the original coded picture.

Figure 19:
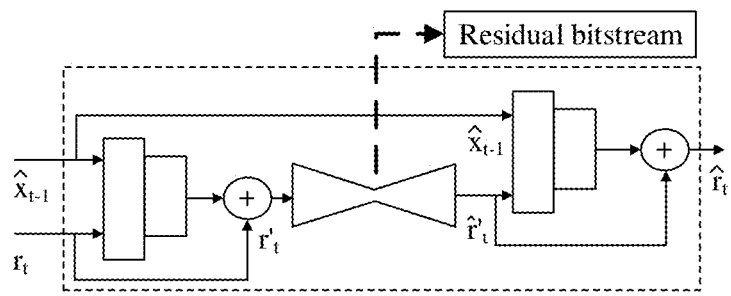
FIG. 19 illustrates a schematic diagram of a twelfth partial structure of an encoding end network in an embodiment of the disclosure.

FIG. 19 illustrates a schematic diagram of a twelfth partial structure of an encoding end network in an embodiment of the disclosure. As illustrated in FIG. 19, the side information is a previous reconstructed unit $\hat{x}_{t-1}$.

Figure 20:
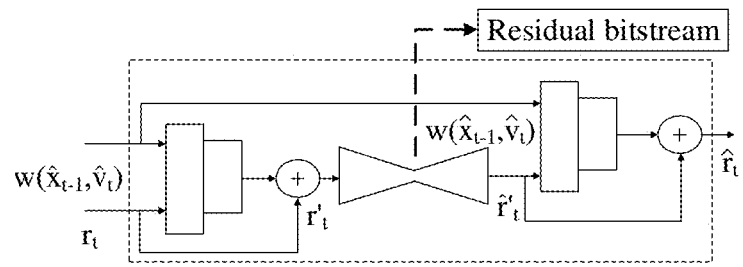
FIG. 20 illustrates a schematic diagram of a thirteenth partial structure of an encoding end network in an embodiment of the disclosure.

FIG. 20 illustrates a schematic diagram of a thirteenth partial structure of an encoding end network in an embodiment of the disclosure. As illustrated in FIG. 20, the side information is distortion information $w(\hat{x}_{t-1}, \hat{v}_t)$ of $\hat{v}_t$ and $\hat{x}_{t-1}$.

Figure 21:
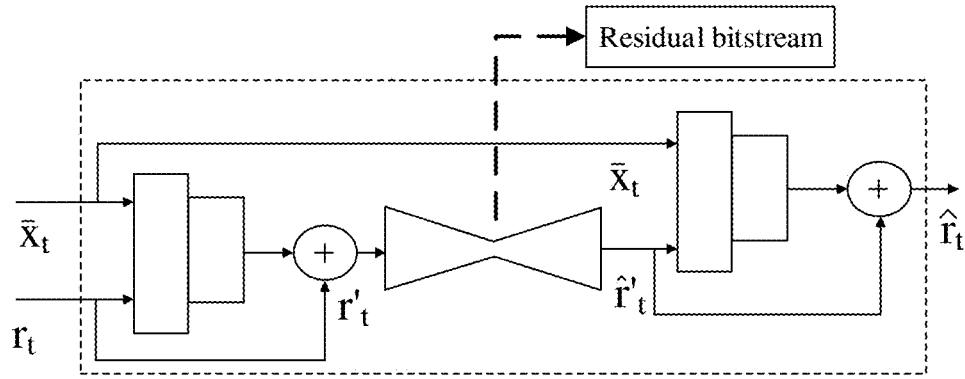
FIG. 21 illustrates a schematic diagram of a fourteenth partial structure of an encoding end network in an embodiment of the disclosure.

FIG. 21 illustrates a schematic diagram of a fourteenth partial structure of an encoding end network in an embodiment of the disclosure. As illustrated in FIG. 21, the side information is a previous prediction unit $\hat{x}_t$. It is to be noted that if the first information to be coded is motion information, the side information cannot be the prediction unit $\hat{x}_t$.

Figure 22:
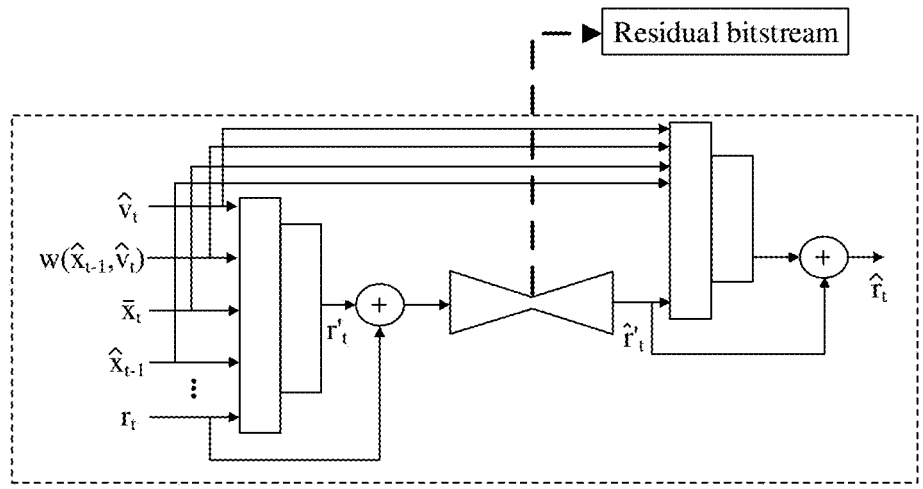
FIG. 22 illustrates a schematic diagram of a fifteenth partial structure of an encoding end network in an embodiment of the disclosure.
Figure 23:
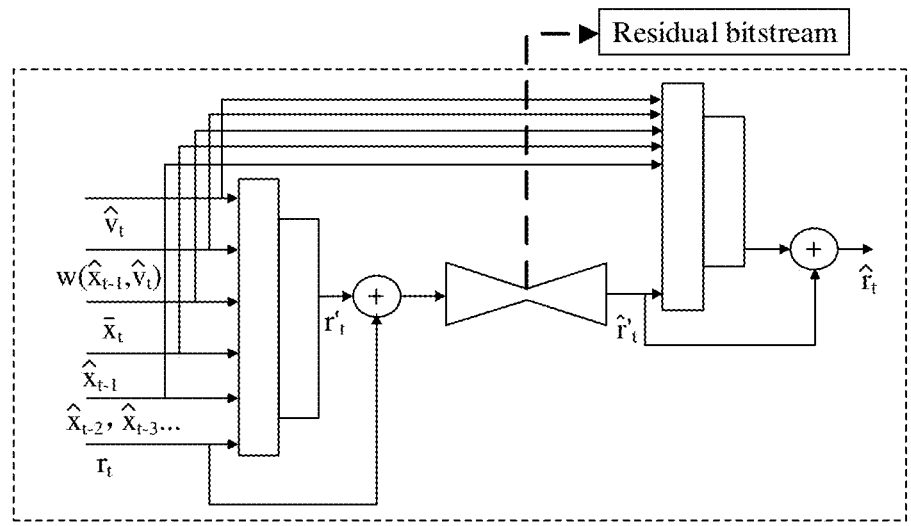
FIG. 23 illustrates a schematic diagram of a sixteenth partial structure of an encoding end network in an embodiment of the disclosure.

The side information may include various types of side information. FIG. 22 illustrates a schematic diagram of a fifteenth partial structure of an encoding end network in an embodiment of the disclosure. As illustrated in FIG. 22, the side information includes $\hat{v}_t$, $w(\hat{x}_{t-1}, \hat{v}_t)$, $\bar{x}_t$, $\hat{x}_{t-1}$ and so on. FIG. 23 illustrates a schematic diagram of a sixteenth partial structure of an encoding end network in an embodiment of the disclosure. As illustrated in FIG. 23, the side information includes $\hat{v}_t$, $w(\hat{x}_{t-1}, \hat{v}_t)$, $\bar{x}_t$, $\hat{x}_{t-1}$, $\hat{x}_{t-2}$, $\hat{x}_{t-3}$ and so on.

With the aforementioned technical solutions, during the coding process, the known side information having a correlation with the current coding unit and the preset network model are used for performing filtering on the relevant information to be coded, thereby improving the coding efficiency of the data to be coded. Specifically, the preset network model is set to implement the filtering processing on the first information to be coded, and further part of the inputs of the preset network model are shorted to the output of the preset network model to form a "semi-residual network", which is easier to be trained and applied.

The following are examples for other networks in the DVC video encoding framework illustrated in FIG. 3. The encoding end includes an optical flow estimation network 31, an MV autocodec network 32, a Warp 33, an MC network 34, and a residual autocodec network 35.

The coding process may include the following steps.

Step 1, motion estimation and compression: a current picture $x_t$ and a previous reconstructed picture $\hat{x}_{t-1}$ are input into the optical flow estimation network 31 for motion estimation, to generate motion information, which is recorded as $v_t$. Then, the motion information is encoded and compressed by using the MV autocodec network 32. After quantization and entropy coding (not illustrated in FIG. 3), an MV bitstream is obtained. The MV autocodec network 32 performs inverse quantization and entropy decoding on the MV bitstream, and then obtains motion information $\hat{v}_t$.

Figure 24:
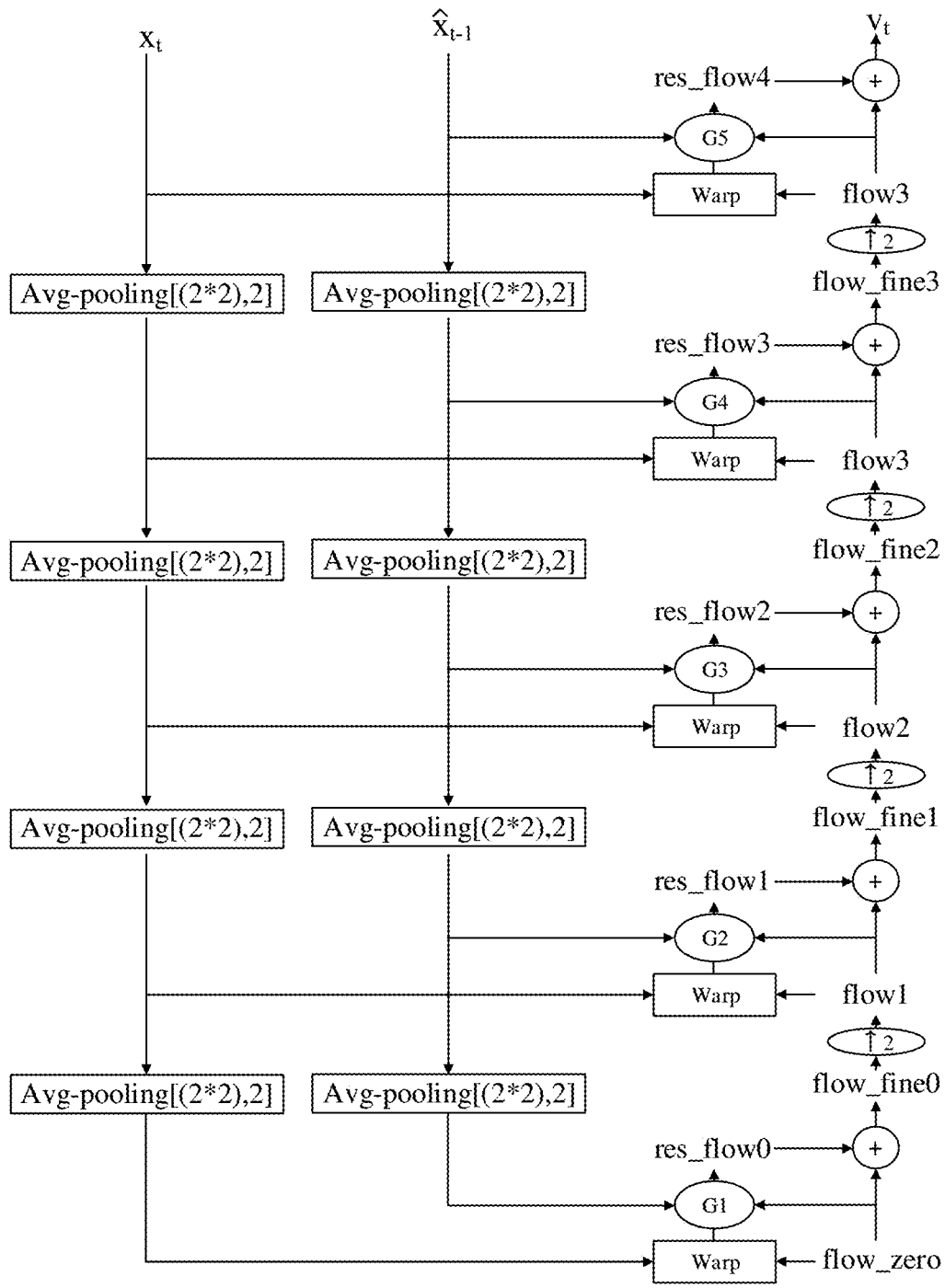
FIG. 24 illustrates a schematic structure diagram of an optical flow estimation network.

FIG. 24 illustrates a schematic structure diagram of an optical flow estimation network. As illustrated in FIG. 24, an average pooling downsampling processing is performed on the current picture $x_t$ and the previous reconstructed picture $\hat{x}_{t-1}$ four times by the optical flow estimation network. An initialized optical flow flow_zero, a current picture Warp after downsampling, and a reconstructed picture and a flow_zero after downsampling are all input to a G network, to obtain a residual res_flow0 of the optical flow. The residual res_flow0 of the optical flow is added to flow_zero, and then upsampling is performed on the added result, to obtain flow1. The above steps are repeated four times, until the optical flow $v_t$ is obtained.

Avg-pooling [(2*2), 2]: average pooling layer, with a convolution kernel size of 2*2, and a step size of 2.

Figure 25:
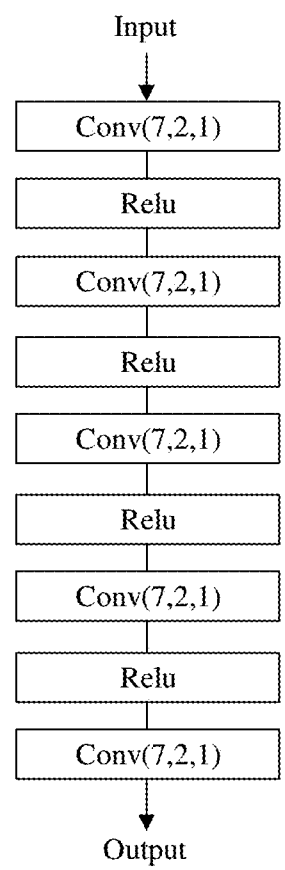
FIG. 25 illustrates a schematic structure diagram of a G network.

FIG. 25 illustrates a schematic structure diagram of a G network. As illustrated in FIG. 25, the G network in the optical flow estimation network may include five convolution layers. The convolution layer represented by Conv(7, 32,1) has a convolution kernel size of 7*7, a filter number of 32, a step size of 1, and Relu serves as an activation function.

Figure 26:
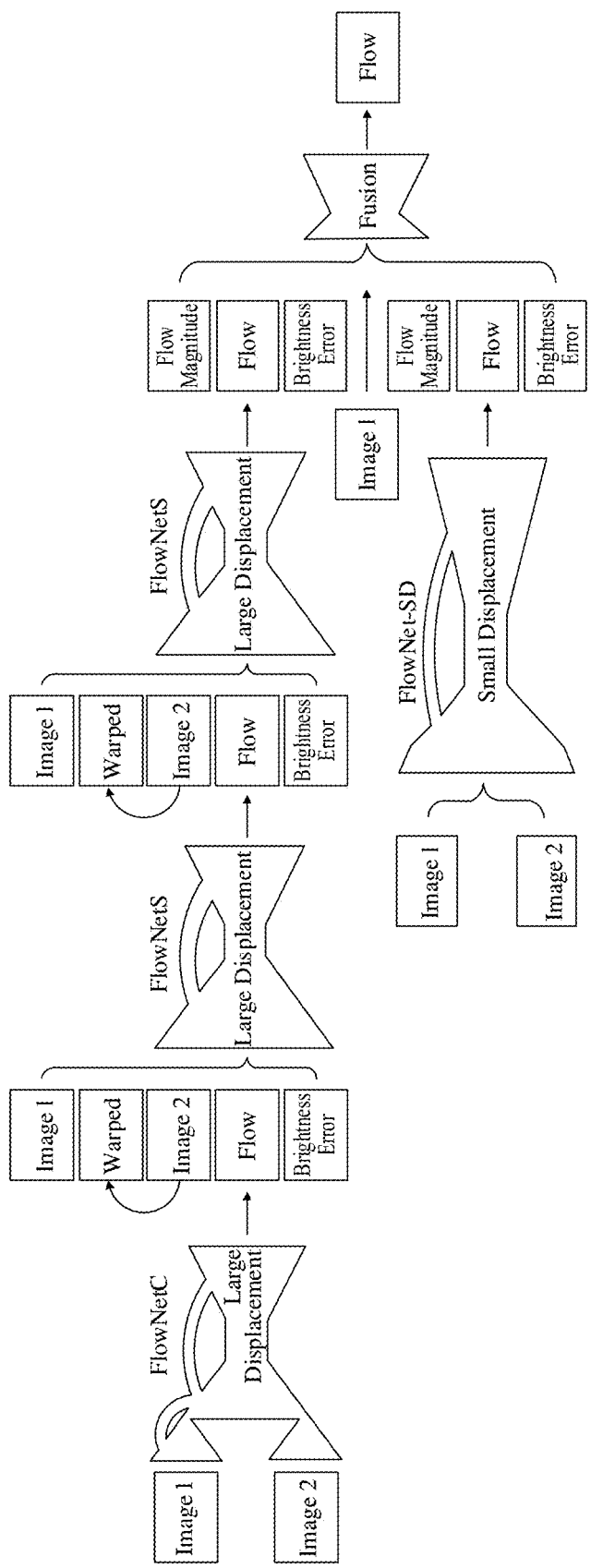
FIG. 26 illustrates a schematic structure diagram of a FlowNet2.0 network.

In practical applications, the optical flow estimation network may be replaced by other optical flow networks, such as FlowNet2.0 network. FIG. 26 illustrates a schematic structure diagram of a FlowNet 2.0 network. As illustrated in FIG. 26, the inputs are the current picture $x_t$ and the previous reconstructed picture $\hat{x}_{t-1}$, and the output is the motion information $v_t$. The whole network is stacked by various FlowNets.

Figure 27:
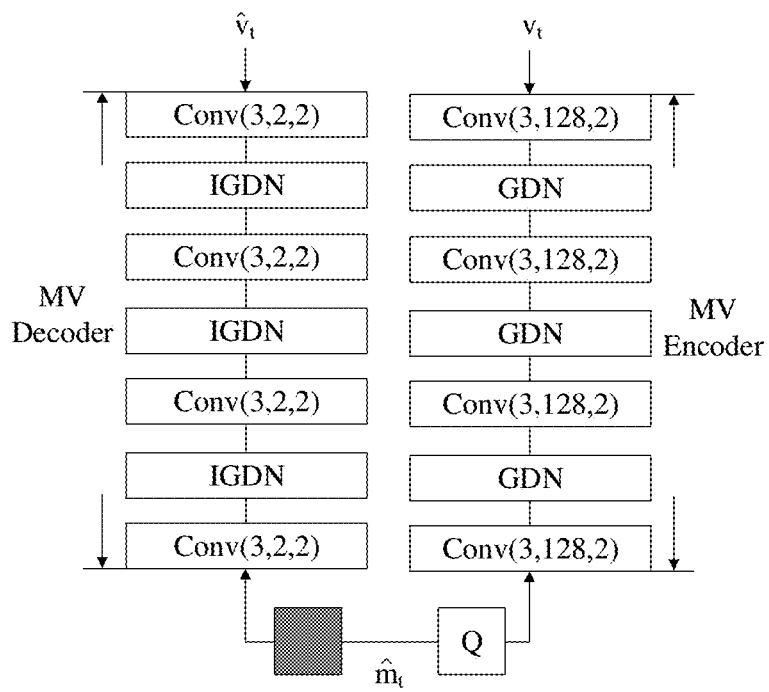
FIG. 27 illustrates a schematic structure diagram of an MV autocodec network.

FIG. 27 illustrates a schematic structure diagram of an MV autocodec network. As illustrated in FIG. 27, the encoding end of the MV autocodec network 32 includes four convolution layers. Each convolution layer has a convolution kernel of 3*3, a filter number of 128, a step size of 2, and GDN serves as the activation function, and the motion information $v_t$ is downsampled for four times. The motion information quantized by the quantizer Q is recorded as $\hat{m}_t$, $\hat{m}_t$ is decoded by the decoding end of the MV autocodec to obtain the motion information $\hat{v}_t$. The decoding end includes four convolution layers. Each convolution layer has a convolution kernel of 3*3, a filter number of 2, a step size of 2, and IGDN serves as the activation function. $\hat{m}_t$ is upsampled for four times, to obtain $\hat{v}_t$.

Step 2, motion compensation: based on $\hat{v}_t$ and the previous reconstructed picture $\hat{x}_{t-1}$, a deep neural network is used for performing the motion compensation to obtain $\bar{x}_t$. Firstly, a distortion operation (i.e., warp 33) is performed on the previous reconstructed picture by using $v_t$, to obtain $w(\hat{x}_{t-1},\hat{v}_t)$. $w(\hat{x}_{t-1},\hat{v}_t)$, $\hat{x}_{t-1}$ and $\hat{v}_t$ as inputs are input to a CNN motion compensation network (i.e., the MC network 34), to obtain a prediction picture $\bar{x}_t$.

Figure 28:
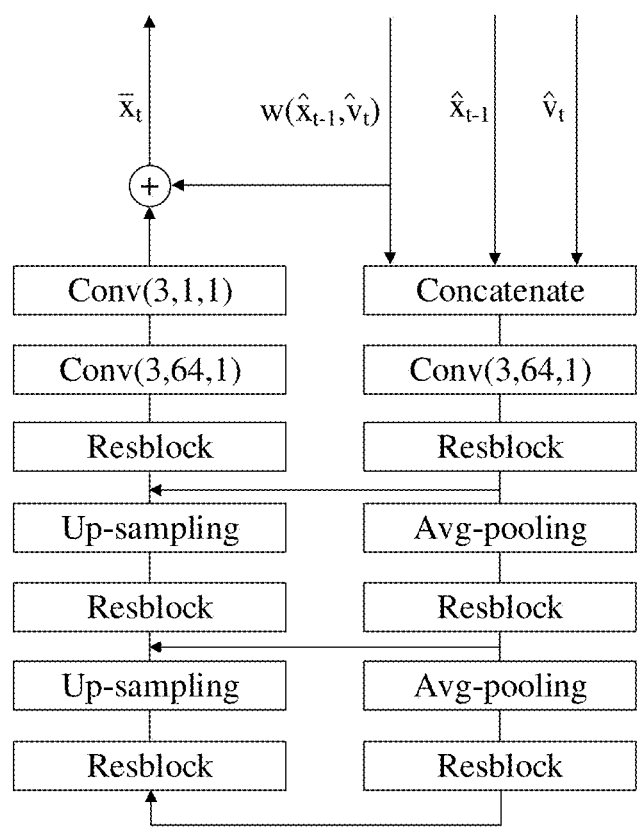
FIG. 28 illustrates a schematic structure diagram of a motion compensation network.

FIG. 28 illustrates a schematic structure diagram of a motion compensation network. As illustrated in FIG. 28, the motion compensation network (i.e., the MC network 34) includes a connection layer, convolution layers, residual layers, average pooling layers and sampling rate conversion modules. In practical applications, the sampling rate conversion module can perform upsampling or downsampling on the data.

Specifically, $w(\hat{x}_{t-1},\hat{v}_t)$, $\hat{x}_{t-1}$, $\hat{v}_t$ are input into a connection layer (Concatenate). The connection layer is followed by a convolution layer (Conv(3,64,1)). The convolution layer is followed by at least two first residual layers (Resblock) sequentially connected in series, and an average pooling layer (Avg-pooling) is connected between the adjacent first residual layers. The first residual layer is followed by at least two second residual layers sequentially connected in series, and a sampling rate conversion module is connected between the adjacent second residual layers. The second residual layer is followed by two second convolution layers (i.e., Conv(3,64,1) and Conv(3,1,1)) sequentially connected in series. The last convolution layer outputs the prediction picture $x_t$ of the current picture.

Figure 29:
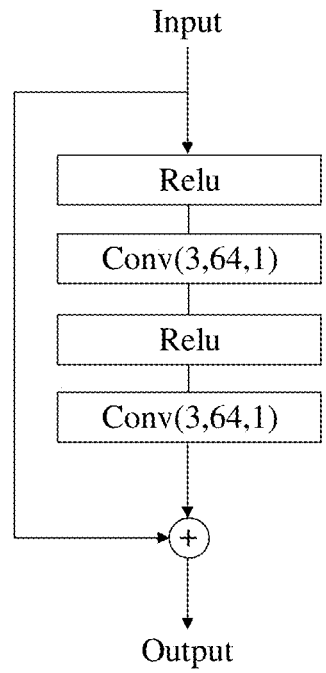
FIG. 29 illustrates a schematic structure diagram of a residual layer.

FIG. 29 illustrates a schematic structure diagram of a residual layer. As illustrated in FIG. 29, the residual layer is formed by two convolution layers, Relu is an activation function, and the input of residual layer is shorted to the output by an adder.

It should be noted that the motion compensation network may use other stacking modes or may be other motion compensation networks, such as a U-net.

Step 3, residual compression: a residual $r_t=x_t-\bar{x}_t$ is predicted, the residual information is compressed by the residual autocodec network 35, then quantized and entropy encoded to generate a residual bitstream. The residual autocodec network 35 performs inverse quantization and entropy decoding on the residual bitstream, and then obtains a prediction residual $\hat{r}_t$.

Figure 30:
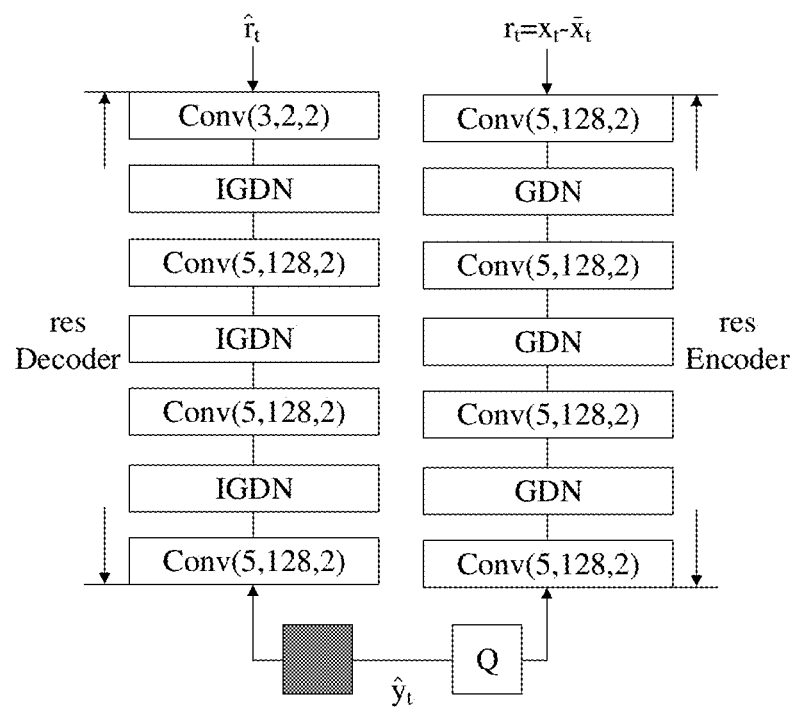
FIG. 30 illustrates a schematic structure diagram of a residual autocodec network.

FIG. 30 illustrates a schematic structure diagram of a residual autocodec network. As illustrated in FIG. 30, the encoding end (res Encoder) the residual autocodec network 35 includes four convolution layers. Each convolution layer has a convolution kernel of 5*5, a filter number of 128, a step size of 2, and GDN is the activation function. The prediction residual $r_t=x_t-\bar{x}_t$ is downsampled for four times. The residual information quantized by the quantizer Q is recorded as $\hat{y}_t$. $\hat{y}_t$ is decoded by the residual decoding end (res Decoder) to obtain the residual information $\hat{r}_t$. The decoding end includes four convolution layers. First three convolution layer have a convolution kernel size of 5*5 and a filter number of 128, and the last convolution layer has a convolution kernel size of 3*3 and a filter number of 3, each convolution layer has a step size of 2, and IGDN serves as the activation function. $\hat{y}_t$ is upsampled for four times to obtain $\hat{r}_1$.

Step 4, video picture reconstruction: the prediction picture $\bar{x}_t$ of the current picture in Step 2 and the prediction residual $\hat{r}_t$ of the current picture in Step 3 are added to obtain a reconstructed picture $\hat{x}_t$ of the current picture.

It should be noted that the embodiments of the disclosure only takes the DVC encoding framework as an example for illustration. In practical applications, any other lossy or lossless compression autocodec framework can also adopt the encoding method according to the embodiments of the disclosure to perform filtering on the written bitstream, so as to improve the coding efficiency and the accuracy of the prediction value.

Figure 31:
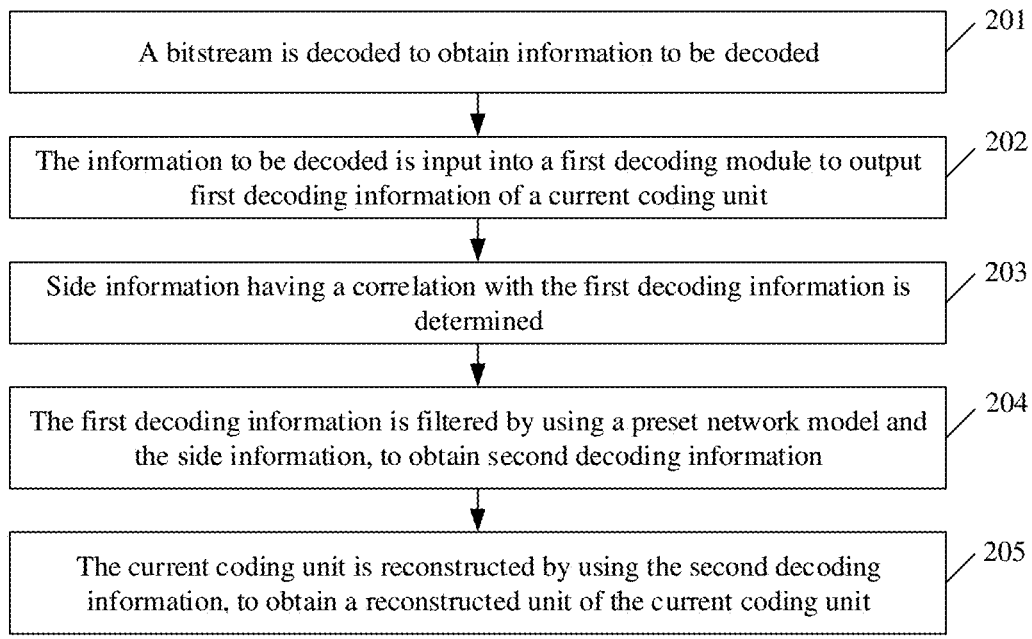
FIG. 31 is a schematic flowchart of a method for decoding a video according to an embodiment of the disclosure.

FIG. 31 is a schematic flowchart of a method for decoding a video according to an embodiment of the disclosure. The method is applied to a decoder. As illustrated in FIG. 31, the method includes the following operations.

In 201, a bitstream is parsed to obtain information to be decoded.

In practical applications, the decoding end decodes the bitstream to obtain bitstreams corresponding to different types of information to be decoded from the bitstream.

The information to be decoded may be information of any video picture obtained from the bitstream, and includes motion information of the picture, residual information of the picture and the like.

Specifically, the information to be decoded includes motion information of the current coding unit. The bitstream is parsed to obtain P bits in the bitstream, where P is a positive integer. Motion information to be decoded is obtained from the bitstream according to a length of a motion information bitstream (referred to as "MV bitstream") indicated by the P bits.

The information to be decoded includes residual information of the current coding unit. The bitstream is parsed to obtain Q bits in the bitstream, where Q is a positive integer. Residual information to be decoded is obtained from the bitstream according to a length of a residual information bitstream (referred to as "residual bitstream") indicated by the Q bits.

In practical applications, the residual bitstream and the MV bitstream are both written into a bin file and transmitted to the decoding end, and meanwhile, a length of the MV bitstream is recorded in the first two bits (i.e., P=2) of the bin file. The decoding end separates the MV bitstream from the bin file, and if only the residual bitstream and the MV bitstream are included in the bitstream, the MV bitstream is followed by the residual bitstream. If other information bitstreams are included, the residual bitstream needs to be separated according to the length of the residual information bitstream.

In 202, the information to be decoded is input into a first decoding module to output first decoding information of a current coding unit.

It should be noted that a coding unit is a picture or an area in the picture. When the coding unit is a picture, the decoding method can be understood as performing enhancement on the decoding information and performing filtering on the first decoding information by using a correlation between adjacent pictures in video pictures, thereby improving prediction accuracy.

It should be noted that the method for decoding a video according to the embodiments of the disclosure can be applied to any lossy or lossless compression decoding network framework, to perform enhancement on the decoding information, thereby improving the prediction accuracy.

The first decoding module is used to decode the information to be decoded to obtain the first decoding information. The first decoding module may be the MV decoding network 41 or the residual decoding network 44 illustrated in FIG. 32.

In 203, side information having a correlation with the first decoding information is determined.

It should be noted that the side information is information having a certain correlation with the first decoding information. It is to be understood that, the side information and the first decoding information have common information. The side information may be used for enhancing the first decoding information before decoding and thereby improving the accuracy of the second decoding information.

Exemplarily, the side information includes at least one of the following: reconstructed units of one or more coding units prior to the current coding unit based on a decoding sequence; reconstructed motion information of the current coding unit; reconstructed motion information of the one or more coding units prior to the current coding unit based on the decoding sequence; distortion information of the current coding unit; or, a prediction value of the current coding unit.

It should be noted that the distortion information of the current coding unit is information obtained by performing distortion operation on the reconstructed motion information of the current coding unit and the reconstructed units of the one or more coding units prior to the current coding unit based on the decoding sequence.

In practical applications, a coding unit prior to the current coding unit may be a coding unit adjacent in time prior to the current coding unit, or, a coding unit not adjacent in time prior to the current coding unit, or, a coding unit adjacent in space prior to the current coding unit, or, a coding unit not adjacent in space prior to the current coding unit.

Multiple coding units prior to the current coding unit may be multiple coding units prior to the current coding unit that are adjacent in time, or, multiple coding units prior to the current coding unit that are not adjacent in time, or, multiple coding units prior to the current coding unit that are adjacent in space, or, multiple coding units prior to the current coding unit that are not adjacent in space.

It should be noted that since there is more than one type of side information, at least one of the side information mentioned above may be used to participate in the filtering process of the first decoding information in the embodiments of the disclosure.

In 204, the first decoding information is filtered by using a preset network model and the side information, to obtain second decoding information.

In 205, the current coding unit is reconstructed by using the second decoding information, to obtain a reconstructed unit of the current coding unit.

In some embodiments, the preset network model may include a first network model. The first network model performs enhancement and filtering on the prediction information, such that the enhanced prediction value is closer to a real value, and thus prediction accuracy can be effectively improved, and the coding efficiency of the subsequent information to be coded can be further improved.

Figure 32:
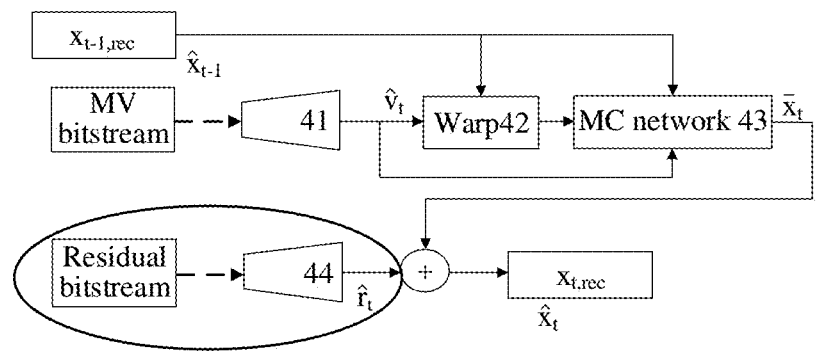
FIG. 32 is a representation of a DVC video decoding framework.

FIG. 32 illustrates a representation of a DVC video decoding framework. As illustrated in FIG. 32, the decoding end includes an MV decoding network 41, a Warp 42, an MC network 34, and a residual decoding network 44.

The decoding process may include the following steps.

Step 1, motion information decoding: after the decoding end obtains the MV bitstream, entropy decoding is performed firstly, and then the MV decoding network 41 is adopted to decode the MV bitstream, to obtain motion information $\hat{v}_t$.

Step 2, motion compensation: based on $\hat{v}_t$ and a previous reconstructed picture $\hat{x}_{t-1}$, the motion compensation is performed by using a deep neural network to obtain $\hat{x}_t$. Firstly, a distortion operation (i.e., warp 42) is performed on the previous reconstructed picture by using $v_t$, to obtain $w(\hat{x}_{t-1}, \hat{v}_t)$. $w(\hat{x}_{t-1},\hat{v}_t)$, $\hat{x}_{t-1}$, and $\hat{v}_t$ as inputs are input to a CNN motion compensation network (i.e., the MC network 43), to obtain a prediction picture $\bar{x}_t$.

Step 3, residual information decoding: after the decoding end obtains the residual bitstream, a decoder in the residual decoding network 44 is adopted to decode the bitstream, to obtain $\hat{r}_t$.

Step 4, video picture reconstruction: $\bar{x}_t$ in Step 2 and $\hat{r}_t$ in Step 3 are added to obtain a reconstructed picture $\hat{x}_t$.

In practical applications, the decoding information may include MV information, residual information and other information. When the first decoding information is MV information, the first network model may be set after the MV decoding network 41 to perform filtering on the decoded MV information for enhancing the MV prediction value, to improve the prediction accuracy. When the first decoding information is residual information, the first network model may be set after the residual decoding network 44 to perform filtering on the decoded MV information for enhancing the MV prediction value, to improve the prediction accuracy. When the first decoding information is other information written into the bitstream, the first network model may be set after autocodec networks for other information.

Figure 33:
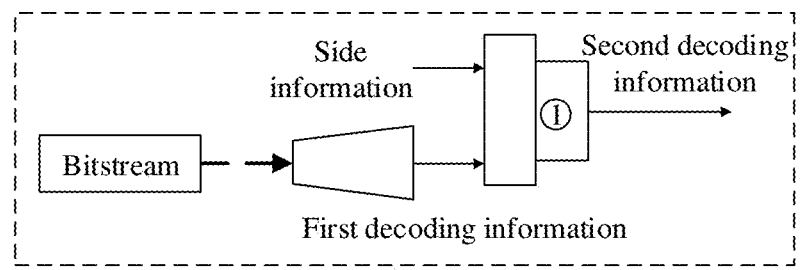
FIG. 33 illustrates a schematic diagram of a first partial structure of a decoding end network in an embodiment of the disclosure.

FIG. 33 illustrates a schematic diagram of a first partial structure of a decoding end network in an embodiment of the disclosure. As illustrated in FIG. 33, the preset network model includes the first network model ①, the first network model may be added after the MV decoding network 41 and/or the residual decoding network 44 in FIG. 32.

In some embodiments, the first network model includes at least a first neural network model.

The first neural network model includes a convolution layer(s), a residual layer(s), an average pooling layer(s) and a sampling rate conversion module(s).

In some embodiments, the first neural network model includes a first convolution layer, at least one second convolution layer, first residual layers, second residual layers, an average pooling layer, and a sampling rate conversion module. The first convolution layer is followed by at least two first residual layers connected in series, and an average pooling layer is connected between the adjacent first residual layers. At least one of the first residual layers is followed by at least two second residual layers connected in series, and a sampling rate conversion module is connected between the adjacent second residual layers. At least one of the second residual layers is connected in series with the at least one second convolution layer.

Specifically, the first decoding information and the side information are input into a connection layer. The connection layer is followed by one first convolution layer. The first convolution layer is followed by at least two first residual layers connected in series, and one average pooling layer is connected between the adjacent first residual layers. At least one of the first residual layers is followed by at least two second residual layers connected in series, and one sampling rate conversion module is connected between the adjacent second residual layers. At least one of the second residual layers is followed by two second convolution layers connected in series. The last second convolution layer outputs the second decoding information.

It should be noted that the connection layer is used for concatenating the input side information and first decoding information and inputting the information into the next layer. The first convolution layer is used for extracting features from the input information and inputting the extracted features into the next layer. The average pooling layer is used for performing downsampling to reduce dimension, removing redundant information, compressing the features, simplifying network complexity, reducing computation, reducing memory consumption and so on. The sampling rate conversion module is used for performing upsampling or downsampling on the input information, and the second convolution layer is also used for extracting features from the input information.

In some embodiments, the method further includes the following operations, First category identification information is preset for the first network model, and the first category identification information is used for indicating an operating mode of the first network model. In response to the first category identification information indicating a first operating mode, the first decoding information is set to be equal to the second decoding information. In response to the first category identification information indicating a second operating mode, the first decoding information of the current coding unit is filtered by using the preset network model and the side information to obtain the second decoding information.

It should be noted that the first category identification information is used for indicating an operating mode of the first network model, and the operating mode includes a first operating mode and a second operating mode. In the first operating mode, the first decoding information is set to be equal to the second decoding information, which can be understood as that the first network model is not used to perform filtering on the first decoding information at the decoding end network, but the first decoding information is directly input into the decoding network. The first operating mode is equivalent to that the first network model is disabled. In the second operating mode, the first relevant information to be coded of the current coding unit is filtered by using the preset network model and the side information, to obtain the second relevant information to be coded, which can be understood as that the first network model is used to perform filtering on the first decoding information at the decoding end network. The second operating mode is equivalent to that the first network model is enabled.

At the encoding end, the rate-distortion decision is used for determining the optimal rate-distortion performance. The operating mode of the first network model is determined according to the optimal rate-distortion performance According to the embodiments of the disclosure, the rate-distortion decision is made to decide whether to use a preset network model, and the determined first category identification information is written into a header of the bitstream to be transmitted to the decoding end. In order to cooperate with the operations at the encoding end, reverse processing is required to be performed at the decoding end after the decoding network at the same time. Therefore, the preset network model is used or not used at both the encoding end and the decoding end.

At the decoding end, the bitstream is parsed to determine the first category identification information. The first category identification information is used for indicating the operating mode of the first network model.

In response to the first category identification information indicating the first operating mode, the second decoding information is set to be equal to the first decoding information.

In response to the first category identification information indicating the second operating mode, the first decoding information and the side information are input into the first network model, to output the second decoding information.

In practical applications, when various categories of side information are input into the first network model, the optimal side information category for the first network model may be selected through the rate-distortion decision.

In some embodiments, the method may further include the following operations. Second category identification information is preset for the first network model, and the second category identification information is used for indicating a category of input side information. In response to the first category identification information indicating the second operating mode, the second category identification information indicates at least one category of input side information, the first decoding information of the current coding unit is filtered by using the preset network model and the side information to obtain the second decoding information.

It should be noted that the first category identification information is used for indicating an operating mode of the first network model, and the operating mode includes a first operating mode and a second operating mode. In the first operating mode, the first decoding information is set to be equal to the second decoding information, which may be understood as that the first network model is not used to perform filtering on the first decoding information at the decoding end network. The first operating mode is equivalent to the first network model being disabled. In the second operating mode, the first decoding information of the current coding unit is filtered by using the preset network model and the side information, to obtain the second decoding information, which may be understood as that the first network model is used to perform filtering on the first decoding information at the decoding end network. The second operating mode is equivalent to the first network model being enabled.

The second category identification information is used for indicating at least one category of input side information. When the first network model is in the second operating mode, the first network model may be divided into multiple types of network models according to different categories of the input side information. The rate-distortion decision is used for determining the optimal rate-distortion performance, and the category of the side information input in the first network model under the second operating mode is determined according to the optimal rate-distortion performance According to the embodiments of the disclosure, the rate-distortion decision is made to decide whether to use a preset network model and which side information to be used as the input. The determined first category identification information and second category identification information are written into the header of the bitstream to be transmitted to the decoding end. In order to cooperate with the operations at the decoding end, reverse processing is required to be performed at the decoding end in the decoding network at the same time. Therefore, the preset network model is used at both the encoding end and the decoding end, and the side information category input into the network model that is indicated by the second category identification information at the encoding end is the same as that at the decoding end.

At the encoding end, the rate-distortion decision is made to determine the target first category identification information and second category identification information corresponding to the target measurement result that represents the optimal rate-distortion performance.

At the decoding end, the bitstream is parsed to determine second category identification information. The second category identification information is used for indicating the category of the input side information. The side information input into the first network model is determined based on the second category identification information.

In practical applications, by instructing a switch to be on and off, the first category identification information and the second category identification information indicate whether to use the preset network model and which side information to be used as the input. That is, a switch may be set at an intersection of the preset network model and the backbone network, and is controlled to be on and off to select whether to use the preset network model. Moreover, a switch may be set at the input end for the side information of the preset network model, and is controlled to be on and off to select whether to input the corresponding side information into the preset network model.

As illustrated in FIG. 6, taking the first decoding information to be residual information as an example, the prediction residual $r'_t$ directly output from the residual decoding network 44 and the side information $\hat{v}_t$ are input into a connection layer (Concatenate). The connection layer is followed by a convolution layer (Conv(3,64,1)), the convolution layer is followed by two first residual layers (Resblock) sequentially connected in series, and an average pooling layer (Avg-pooling) is connected between the adjacent first residual layers. The first residual layer is followed by two second residual layers sequentially connected in series, and an up-sampling module (Up-sampling) is connected between the adjacent second residual layers. The second residual layer is followed by two convolution layers (i.e., Conv(3,64,1) and Conv(3,1,1)) sequentially connected in series. The last convolution layer outputs the final prediction residual 4. The number of the first residual layers is equal to the number of the second residual layers, and the information output from the first residual layer is also input into a corresponding second residual layer.

In the embodiments of the disclosure, the first network model is obtained by model training. In some embodiments, the model training may specifically include the following operations.

A first training sample set is obtained. The first training sample set includes one or more sample pictures. An initial network model is constructed, and the first training sample set is input into the initial network model for model training. In response to a loss value of a loss function being greater than a loss threshold, parameters of the initial network model are adjusted until the loss value is less than the loss threshold, to obtain a trained network model. The trained network model is taken as the first network model.

The training sample set may be a training sample set stored locally by the decoder, a training sample set obtained from a remote server according to a link or address information, or even a decoded picture sample set in a video, which is not specifically limited in the embodiments of the disclosure.

In this way, after obtaining the training sample set, the initial network model may be trained by using the training sample set through a cost function. When the loss value (Loss) of the cost function converges to a certain preset threshold, the trained initial network model is the preset network model. The cost function may be a rate-distortion cost function, and the preset threshold may be specifically set according to the actual situation, which is not limited in the embodiments of the disclosure.

It is also to be noted that, for determining the preset network model, network model parameters in the preset network model may be determined firstly. In some embodiments, the operation that the preset network model is determined may include the following operations. The network model parameters are determined. The preset network model is constructed according to the determined network model parameters.

In the embodiments of the disclosure, the network model parameters may be determined by model training. Specifically, in some embodiments, determination of the network model parameters may include the following operations. A training sample set is obtained. An initial network model is constructed, and the initial network model includes model parameters. The initial network model is trained by using the training sample set, and the model parameters in the trained initial network model are determined as the network model parameters.

In such case, at the encoding end, after the network model parameters are obtained by the model training, the network model parameters may be written into the bitstream. In this way, the decoding end may decode the bitstream to directly obtain the network model parameters, and the preset network model is constructed without the model training at the decoding end.

Examples of types of the side information input to the first network model are described below. The two added depths may be other side information according to the network input, such as, one or more reference reconstructed units $\hat{x}_{t-1}(\hat{x}_{t-2}, \hat{x}_{t-3}, \hat{x}_{t-4}$ and the like), a picture $w(\hat{x}_{t-1}, \hat{v}_t)$ ($w(\hat{x}_{t-2}, \hat{v}_t)$ and the like) obtained by performing a warped operation on reconstructed motion information $\hat{v}_t$ and the reconstructed unit $\hat{x}_{t-1}(\hat{x}_{t-2}, \hat{x}_{t-3}, \hat{x}_{t-4}$ and the like), and so on.

Figure 34:
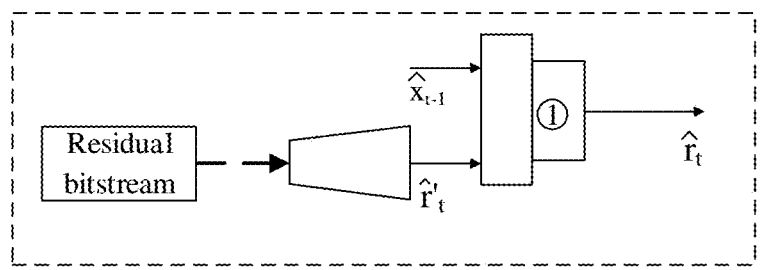
FIG. 34 illustrates a schematic diagram of a second partial structure of a decoding end network in an embodiment of the disclosure.

FIG. 34 illustrates a schematic diagram of a second partial structure of a decoding end network in an embodiment of the disclosure. As illustrated in FIG. 34, taking the first decoding information to be residual information as an example, the side information is a previous reconstructed unit $\hat{x}_{t-1}$ of the current coding unit (at the encoding end, $\hat{v}_t$ is decoded from the MV autocodec network 32; at the decoding end, $\hat{v}_t$ is decoded by using the MV decoding network after the MV bitstream is obtained).

The input for the first network model also includes the output $\hat{r}'_t$ from the residual autocodec network 35. In the output $\hat{r}_t$ after passing through the first network model, the common part between the motion information and the residual information is supplemented. The output $\hat{r}_t$ carries more information than the output which makes the final reconstructed picture to be closer to the original decoded picture.

Figure 35:
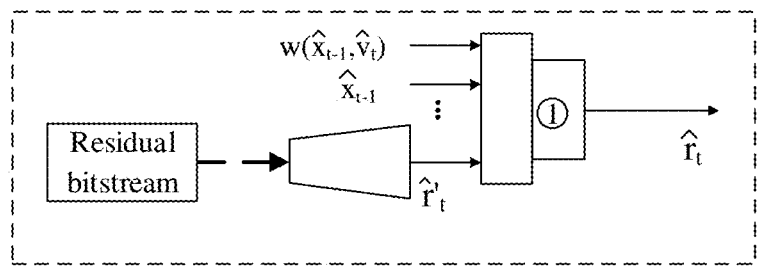
FIG. 35 illustrates a schematic diagram of a third partial structure of a decoding end network in an embodiment of the disclosure.

FIG. 35 illustrates a schematic diagram of a third partial structure of a decoding end network in an embodiment of the disclosure. As illustrated in FIG. 35, the side information is the previous reconstructed unit $\hat{x}_{t-1}$ and the distortion information $w(\hat{x}_{t-1}, \hat{v}_t)$ of $\hat{v}_t$ and $\hat{x}_{t-1}$.

With the aforementioned technical solutions, during the coding process, the known side information having a correlation with the current coding unit and the preset network model are used for performing filtering on the relevant information to be coded, thereby improving the coding efficiency of the data to be coded.

Embodiments of the disclosure further illustrate the method for decoding the video.

In other embodiments, the preset network model includes a first network model. The first network model is used for performing enhancement and filtering on the prediction information. Part of input ends of the first network model are shorted to an output end of the first network model. That is, part of the input ends are connected to the output end to form a semi-residual network model. Such semi-residual network model is easy to be trained and applied, and can be trained faster with higher learning efficiency and better filtering effect than a non-shorted network model.

In some embodiments, an input end for the first decoding information in the first network model is shorted to the output end.

Figure 36:
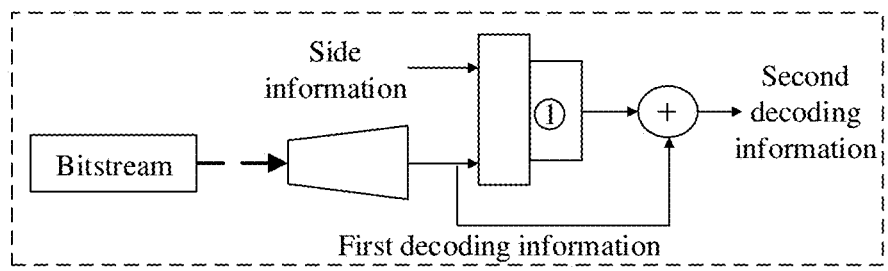
FIG. 36 illustrates a schematic diagram of a fourth partial structure of a decoding end network in an embodiment of the disclosure.

FIG. 36 illustrates a schematic diagram of a fourth partial structure of a decoding end network in an embodiment of the disclosure. As illustrated in FIG. 36, when the preset network model only includes the first network model ①, the first network model may be added after the MV decoding network 41 and/or the residual decoding network 44 in FIG. 32, and the input end for the first decoding information in the first network model is shorted to the output end.

In practical applications, after the bitstream is obtained, the method further includes the following operations. The bitstream is input into the decoding network for decoding, to output the first decoding information. The first decoding information and the side information are input into the first network model, to output the second decoding information. The first network model is used for performing filtering on the first decoding information according to a correlation between the first decoding information and the side information.

That is, the first network model is located after the decoding network, and is used for performing enhancement on the decoding information. It is to be understood that the first network model implements the filtering processing on the first information to be coded by performing enhancement on the decoding information. With enhancement of the decoding information, for the whole decoding end network, using the enhanced decoding information for decoding may also achieve the purpose of reducing the redundancy of the information to be decoded.

In some embodiments, the first network model includes at least a first neural network model and a first adder.

Correspondingly, the operation that the first decoding information and the side information are input into the first network model to output the second decoding information includes the following operations. The first decoding information and the side information are input into the first neural network model to output a first intermediate value. The first intermediate value is added by the first adder to the first decoding information, to obtain the second decoding information.

The first neural network model includes a convolution layer(s), a residual layer(s), an average pooling layer(s) and a sampling rate conversion module(s).

In some embodiments, the first neural network model includes a first convolution layer, at least one second convolution layer, first residual layers, second residual layers, average pooling layers, and sampling rate conversion modules. The first convolution layer is followed by at least two first residual layers connected in series, and an average pooling layer is connected between the adjacent first residual layers. At least one of the first residual layers is followed by at least two second residual layers connected in series, and a sampling rate conversion module is connected between the adjacent second residual layers. At least one of the second residual layers is connected in series with the at least one second convolution layer.

Specifically, the first decoding information and the side information are input into a connection layer. The connection layer is followed by one first convolution layer. The first convolution layer is followed by at least two first residual layers connected in series, and one average pooling layer is connected between the adjacent first residual layers. At least one of the first residual layers is followed by at least two second residual layers connected in series, and one sampling rate conversion module is connected between the adjacent second residual layers. At least one of the second residual layers is followed by two second convolution layers connected in series. Two input ends of the first adder are respectively connected to the input end for the first decoding information and an output end of the last second convolution layer, and an output end of the first adder is taken as the output end of the first network model.

It should be noted that the connection layer is used for concatenating the input side information and first decoding information and inputting the information into the next layer. The first convolution layer is used for extracting features from the input information and inputting the extracted features into the next layer. The average pooling layer is used for performing downsampling to reduce dimension, removing redundant information, compressing the features, simplifying network complexity, reducing computation, reducing memory consumption and so on. The sampling rate conversion module is used for performing upsampling or downsampling on the input information, and the second convolution layer is also used for extracting features from the input information. The adder is used to add the first decoding information and the output information of the last second convolution layer, to output the second decoding information.

In some embodiments, the method further includes the following operations, First category identification information is preset for the first network model, and the first category identification information is used for indicating an operating mode of the first network model. In response to the first category identification information indicating a first operating mode, the first relevant information to be coded is equal to the second relevant information to be coded, and network rate-distortion performance measurement is performed to obtain a first measurement result. In response to the first category identification information indicating a second operating mode, the first relevant information to be coded of the current coding unit is filtered by using the preset network model and the side information to obtain the second relevant information to be coded, and the network rate-distortion performance measurement is performed to obtain a second measurement result. A rate-distortion decision is made based on the first measurement result and the second measurement result, and target first category identification information corresponding to a target measurement result that represents an optimal rate-distortion performance is determined.

It should be noted that the first category identification information is used for indicating an operating mode of the first network model, and the operating mode includes a first operating mode and a second operating mode. In the first operating mode, the first decoding information is set to be equal to the second decoding information, which can be understood as that the first network model is not used to perform filtering on the first decoding information at the decoding end network, but the first decoding information is directly input into the decoding network. The first operating mode is equivalent to that the first network model is disabled. In the second operating mode, the first decoding information of the current coding unit is filtered by using the preset network model and the side information, to obtain the second decoding information, which can be understood as that the first network model is used to perform filtering on the first decoding information at the decoding end network. The second operating mode is equivalent to that the first network model is enabled.

At the encoding end, the rate-distortion decision is used for determining the optimal rate-distortion performance. The operating mode of the first network model is determined according to the optimal rate-distortion performance According to the embodiments of the disclosure, the rate-distortion decision is made to decide whether to use a preset network model, and the determined first category identification information is written into a header of the bitstream to be transmitted to the decoding end. In order to cooperate with the operations at the encoding end, reverse processing is required to be performed at the decoding end after the decoding network at the same time. Therefore, the preset network model is used or not used at both the encoding end and the decoding end.

At the decoding end, the bitstream is parsed to determine the first category identification information. The first category identification information is used for indicating the operating mode of the first network model. In response to the first category identification information indicating the first operating mode, the second decoding information is set to be equal to the first decoding information. In response to the first category identification information indicating the second operating mode, the first decoding information and the side information are input into the first network model, to output the second decoding information.

In practical applications, when various categories of side information are input into the first network model, the optimal side information category for the first network model may be selected through the rate-distortion decision.

In some embodiments, the method may further include the following operations. Second category identification information is preset for the first network model, and the second category identification information is used for indicating a category of input side information. In response to the first category identification information indicating the second operating mode, the second category identification information indicates at least one category of input side information, the first decoding information of the current coding unit is filtered by using the preset network model and the side information to obtain the second decoding information, and the network rate-distortion performance measurement is performed to obtain at least one second measurement result.

It should be noted that the first category identification information is used for indicating an operating mode of the first network model, and the operating mode includes a first operating mode and a second operating mode. In the first operating mode, the first decoding information is set to be equal to the second decoding information, which may be understood as that the first network model is not used to perform filtering on the first decoding information at the decoding end network. The first operating mode is equivalent to the first network model being disabled. In the second operating mode, the first decoding information of the current coding unit is filtered by using the preset network model and the side information, to obtain the second decoding information, which may be understood as that the first network model is used to perform filtering on the first decoding information at the decoding end network. The second operating mode is equivalent to the first network model being enabled.

The second category identification information is used for indicating at least one category of input side information. When the first network model is in the second operating mode, the first network model may be divided into multiple types of network models according to different categories of the input side information. The rate-distortion decision is used for determining the optimal rate-distortion performance, and the category of the side information input in the first network model under the second operating mode is determined according to the optimal rate-distortion performance According to the embodiments of the disclosure, the rate-distortion decision is made to decide whether to use a preset network model and which side information to be used as the input. The determined first category identification information and second category identification information are written into the header of the bitstream to be transmitted to the decoding end. In order to cooperate with the operations at the encoding end, reverse processing is required to be performed at the decoding end after the decoding network at the same time. Therefore, the preset network model is used at both the encoding end and the decoding end, and the side information category input into the network model that is indicated by the second category identification information at the encoding end is the same as that at the decoding end.

At the encoding end, the rate-distortion decision is made to determine the target first category identification information and second category identification information corresponding to the target measurement result that represents the optimal rate-distortion performance. At the decoding end, the bitstream is parsed to determine second category identification information. The second category identification information is used for indicating the category of the input side information. The side information input into the first network model is determined based on the second category identification information.

In practical applications, by instructing a switch to be on and off, the first category identification information and the second category identification information indicate whether to use the preset network model and which side information to be used as the input. That is, a switch may be set at an intersection of the preset network model and the backbone network, and is controlled to be on and off to select whether to use the preset network model. Moreover, a switch may be set at the input end for the side information of the preset network model, and is controlled to be on and off to select whether to input the corresponding side information into the preset network model.

As illustrated in FIG. 16, taking the first decoding information to be residual information as an example, the prediction residual r'$_t$ directly output from the residual decoding network 44 and the side information $\hat{v}_t$ are input into a connection layer (Concatenate). The connection layer is followed by a convolution layer (Conv(3,64,1)), the convolution layer is followed by two first residual layers (Resblock) sequentially connected in series, and an average pooling layer (Avg-pooling) is connected between the adjacent first residual layers. The first residual layer is followed by two second residual layers sequentially connected in series, and an up-sampling module (Up-sampling) is connected between the adjacent second residual layers. The second residual layer is followed by two convolution layers (i.e., Conv(3,64,1) and Conv(3,1,1)) sequentially connected in series. The input end for r'$_t$ is shorted by the adder to the output end, and the adder outputs the final prediction residual $\hat{r}_t$. The number of the first residual layers is equal to the number of the second residual layers, and the information output from the first residual layer is also input into a corresponding second residual layer.

In the embodiments of the disclosure, the first network model is obtained by model training. In some embodiments, the model training may specifically include the following operations.

A first training sample set is obtained, and the first training sample set includes one or more sample pictures. An initial network model is constructed, and the first training sample set is input into the initial network model for model training. In response to a loss value of a loss function being greater than a loss threshold, parameters of the initial network model are adjusted until the loss value is less than the loss threshold, to obtain a trained network model. The trained network model is taken as the first network model.

The training sample set may be a training sample set stored locally by the decoder, a training sample set obtained from a remote server according to a link or address information, or even a decoded picture sample set in a video, which is not specifically limited in the embodiments of the disclosure.

In this way, after obtaining the training sample set, the initial network model may be trained by using the training sample set through a cost function. When the loss value (Loss) of the cost function converges to a certain preset threshold, the trained initial network model is the preset network model. The cost function may be a rate-distortion cost function, and the preset threshold may be specifically set according to the actual situation, which is not limited in the embodiments of the disclosure.

It is also to be noted that, for determining the preset network model, network model parameters in the preset network model may be determined firstly. In some embodiments, the operation that the preset network model is determined may include the following operations. The network model parameters are determined. The preset network model is constructed according to the determined network model parameters.

In the embodiments of the disclosure, the network model parameters may be determined by model training. Specifically, in some embodiments, determination of the network model parameters may include the following operations. A training sample set is obtained. An initial network model is constructed, and the initial network model includes model parameters. The initial network model is trained by using the training sample set, and the model parameters in the trained initial network model are determined as the network model parameters.

In such case, at the encoding end, after the network model parameters are obtained by the model training, the network model parameters may be written into the bitstream. In this way, the decoding end may decode the bitstream to directly obtain the network model parameters, and the preset network model is constructed without the model training at the decoding end.

Examples of types of the side information input to the first network model are described below. The two added depths may be other side information according to the network input, such as, one or more reference reconstructed units $\hat{x}_{t-1}(\hat{x}_{t-2}, \hat{x}_{t-3}, \hat{x}_{t-4}$ and the like), a picture w($\hat{x}_{t-1}, \hat{v}_t$) (w($\hat{x}_{t-2}, \hat{v}_t$) and the like) obtained by performing a warped operation on reconstructed motion information $\hat{v}_t$ and the reconstructed unit $\hat{x}_{t-1}(\hat{x}_{t-2}, \hat{x}_{t-3}, \hat{x}_{t-4}$ and the like), and so on.

Figure 37:
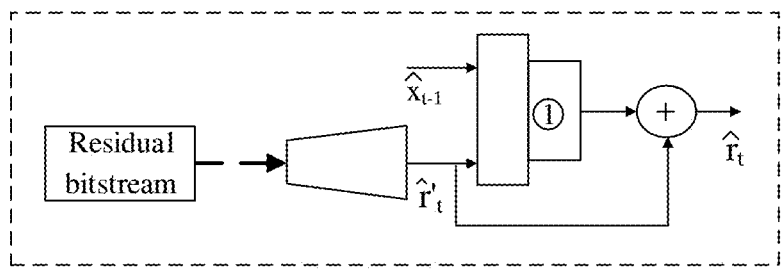
FIG. 37 illustrates a schematic diagram of a fifth partial structure of a decoding end network in an embodiment of the disclosure.

FIG. 37 illustrates a schematic diagram of a fifth partial structure of a decoding end network in an embodiment of the disclosure. As illustrated in FIG. 37, taking the first decoding information to be residual information as an example, the side information is a previous reconstructed unit $\hat{x}_{t-1}$ of the current coding unit (at the decoding end, $\hat{v}_t$ is decoded from the MV decoding network 41; at the decoding end, $\hat{v}_t$ is decoded by using the MV decoding network after the MV bitstream is obtained).

The input for the first network model also includes $\hat{r}'_t$ output from the residual decoding network 44, and one input $\hat{r}'_t$ of the network is connected to the output of the network. In the output $\hat{r}_t$ after passing through the first network model, the common part between the motion information and the residual information is supplemented. The output $\hat{r}_t$ carries more information than the output $\hat{r}'_t$, which makes the final reconstructed picture to be closer to the original decoded picture.

Figure 38:
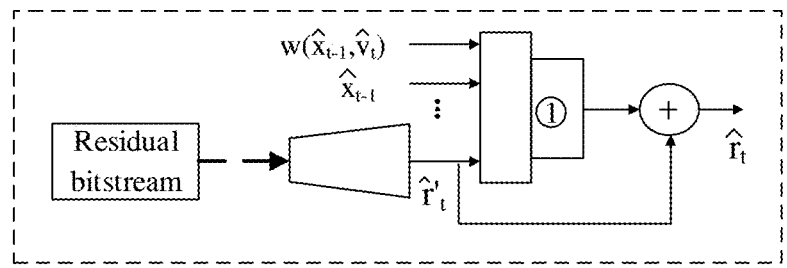
FIG. 38 illustrates a schematic diagram of a sixth partial structure of a decoding end network in an embodiment of the disclosure.

FIG. 38 illustrates a schematic diagram of a sixth partial structure of a decoding end network in an embodiment of the disclosure. As illustrated in FIG. 38, the side information is a previous reconstructed unit $\hat{x}_{t-1}$ and distortion information w($\hat{x}_{t-1},\hat{v}_t$) of $\hat{v}_t$ and $\hat{x}_{t-1}$.

With the aforementioned technical solutions, during the decoding process for data to be decoded, by using the side information having a correlation with the first decoding information, the common information between the first decoding information and the known side information is removed from the first decoding information, thereby improving the decoding efficiency of the data to be decoded. Specifically, the preset network model is set to implement the filtering processing on the first decoding information, and further part of the inputs of the preset network model are shorted to the output of the preset network model to form a "semi-residual network", which is easier to be trained and applied.

Figure 39:
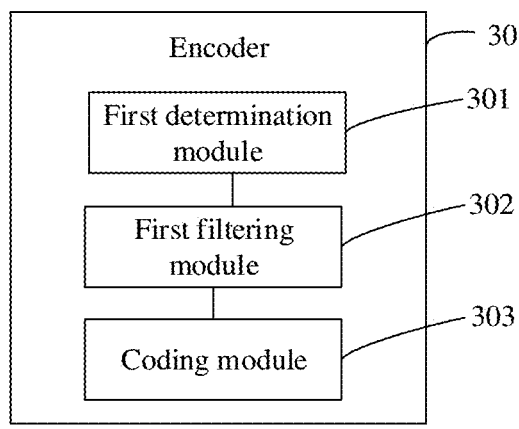
FIG. 39 illustrates a first composition structure diagram of an encoder in an embodiment of the disclosure.

The embodiments of the disclosure provide an encoder. FIG. 39 illustrates a first composition structure diagram of an encoder in an embodiment of the disclosure. As illustrated in FIG. 39, the encoder 30 includes a first determination module 301, a first filtering module 302, and a coding module 303.

The first determination module 301 is configured to determine side information having a correlation with a current coding unit.

The first filtering module 302 is configured to perform filtering on first relevant information to be coded of the current coding unit by using a preset network model and the side information, to obtain second relevant information to be coded.

The coding module 303 is configured to input the second relevant information to be coded into a subsequent coding module for encoding, to obtain a bitstream.

It should be noted that the above modules are also configured to realize the operations of other methods corresponding to the method for encoding the video of the disclosure, which will not be elaborated here.

Figure 41:
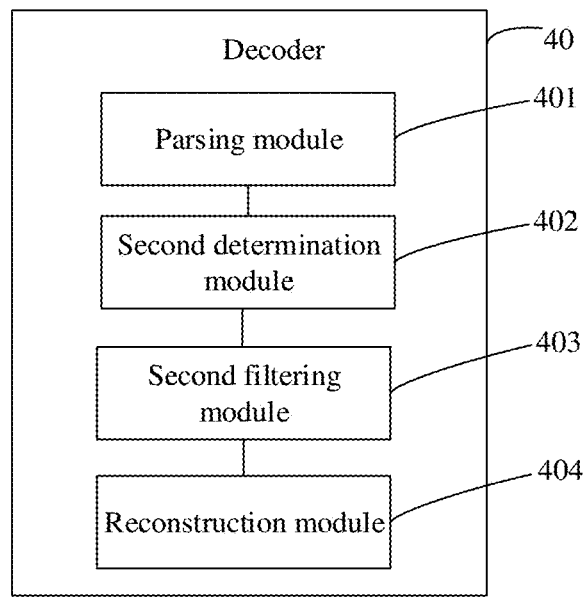
FIG. 41 illustrates a first composition structure diagram of a decoder in an embodiment of the disclosure.

The embodiments of the disclosure provide a decoder. FIG. 41 illustrates a first composition structure diagram of a decoder in an embodiment of the disclosure. As illustrated in FIG. 41, the decoder 40 includes a parsing module 401, a second determination module 402, a second filtering module 403, and a reconstruction module 404.

The parsing module 401 is configured to parse a bitstream to obtain information to be decoded, and input the information to be decoded into a first decoding module to output first decoding information of a current coding unit.

The second determination module 402 is configured to determine side information having a correlation with the first decoding information.

The second filtering module 403 is configured to perform filtering on the first decoding information by using a preset network model and the side information, to obtain second decoding information.

The reconstruction module 404 is configured to reconstruct the current coding unit by using the second decoding information, to obtain a reconstructed unit of the current coding unit.

It should be noted that the above modules are also configured to realize the operations of other methods corresponding to the method for decoding the video of the disclosure, which will not be elaborated here.

Figure 40:
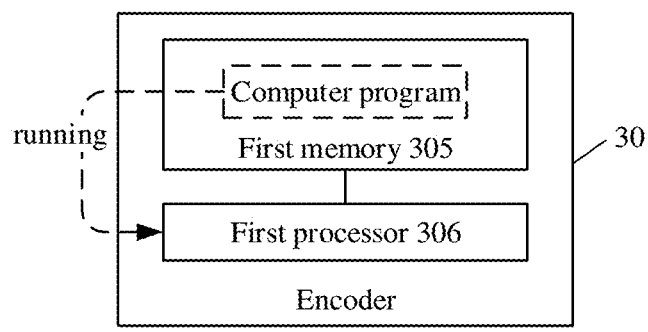
FIG. 40 illustrates a second composition structure diagram of an encoder in an embodiment of the disclosure.

In practical applications, the embodiments of the disclosure further provide an encoder. FIG. 40 illustrates a second composition structure diagram of an encoder in an embodiment of the disclosure. As illustrated in FIG. 41, the encoder 30 includes a first memory 305 and a first processor 306.

The first memory 305 stores a computer program executable on the first processor 306. When executing the program, the first processor 306 implements the method for encoding a video at the encoding end.

Figure 42:
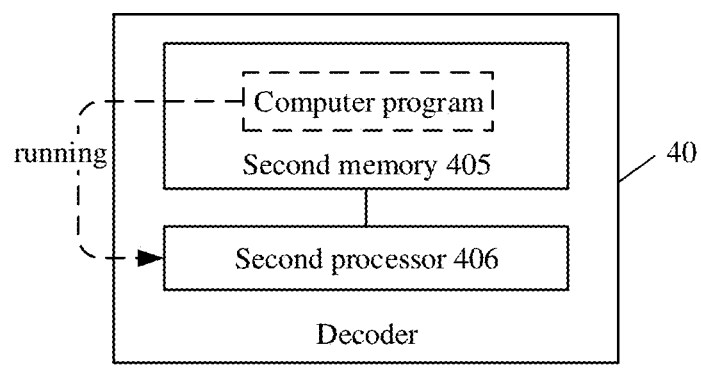
FIG. 42 illustrates a second composition structure diagram of a decoder in an embodiment of the disclosure.

In practical applications, the embodiments of the disclosure further provide a decoder. FIG. 42 illustrates a second composition structure diagram of a decoder in an embodiment of the disclosure. As illustrated in FIG. 42, the decoder 40 includes a second memory 405 and a second processor 406.

The second memory 405 stores a computer program executable on the second processor 406. When executing the program, the second processor 406 implements the method for decoding a video at the decoding end.

It is to be understood that during the coding and decoding process, the decoder performs filtering on the coding/decoding information by using the known side information having the correlation with the information to be coded/decoded and the preset network model, thereby improving the coding efficiency of the data to be coded.

In addition, each functional unit in the embodiments of the disclosure may be integrated into a processing unit, each unit may also physically exist independently, and two or more than two units may also be integrated into a unit. The aforementioned integrated unit may be realized either in the form of hardware or in the form of software function module.

Correspondingly, the embodiments of the disclosure provide a storage medium having stored thereon a computer program. The computer program, when being executed by a first processor, implements the method for encoding a video by an encoder; or, when being executed by a second processor, implements the method for decoding a video by a decoder.

It should be pointed out that the above description of the storage medium and the device embodiments is similar to that of the method embodiments, and the storage medium and the device embodiments also have similar beneficial effects as the method embodiments. Technical details not disclosed in the storage media and device embodiments of the disclosure are understood with reference to the description of the method embodiments of the disclosure.

The above is only the implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

Embodiments of the disclosure provide a method for encoding a video, a method for decoding a video, an encoder, a decoder and a storage medium. The method is applied to the encoder, and includes the following operations. Side information having a correlation with a current coding unit is determined. First relevant information to be coded of the current coding unit is filtered by using a preset network model and the side information, to obtain second relevant information to be coded. The second relevant information to be coded is input into a subsequent coding module for encoding, to obtain a bitstream. As such, during the coding process, the known side information having a correlation with the current coding unit and the preset network model are used to perform filtering on the relevant information to be coded, thereby improving the coding efficiency of the data to be coded.

The invention claimed is:

1. A method for encoding a video, applicable to an encoder, comprises:
   determining side information having a correlation with a current coding unit;
   filtering first relevant information to be coded of the current coding unit by using a preset network model and the side information, to obtain second relevant information to be coded; and
   inputting the second relevant information to be coded into a subsequent coding module for encoding, to obtain a bitstream;
   wherein the preset network model comprises a first network model, and the first network model comprises at least a first neural network model and a first adder; and
   the first neural network model comprises: a first convolution layer, at least one second convolution layer, first residual layers, second residual layers, average pooling layers, and sampling rate conversion modules; wherein the first convolution layer is followed by at least two of the first residual layers connected in series, and an average pooling layer is connected between adjacent first residual layers;

at least one of the first residual layers is followed by at least two of the second residual layers connected in series, and a sampling rate conversion module is connected between adjacent second residual layers; and at least one of the second residual layers is connected in series with the at least one second convolution layer;

wherein filtering the first relevant information to be coded of the current coding unit by using the preset network model and the side information, to obtain the second relevant information to be coded comprises:

obtaining the first decoding information corresponding to first information to be coded of the current coding unit; and inputting the first decoding information and the side information into the first network model to output the second decoding information, wherein the first network model is used for performing enhancement on the first decoding information by using the side information;

wherein part of input ends of the first network model is shorted to an output end of the first network model, and an input end for the first decoding information in the first network model is shorted to the output end.

2. The method of claim 1, wherein the coding unit is a picture or an area in the picture.

3. The method of claim 1, wherein the first relevant information to be coded comprises first decoding information, and the second relevant information to be coded comprises second decoding information.

4. The method of claim 3, wherein inputting the second relevant information to be coded into the subsequent coding module for encoding, to obtain the bitstream comprises:

reconstructing the current coding unit by using the second decoding information, to obtain a reconstructed unit of the current coding unit; and performing subsequent coding according to the reconstructed unit of the current coding unit, to obtain the bitstream.

5. The method of claim 1, wherein inputting the first decoding information and the side information into the first network model to output the second decoding information, comprises:

inputting the first decoding information and the side information into the first neural network model to output a first intermediate value; and adding the first intermediate value to the first decoding information by the first adder, to obtain the second decoding information.

6. A method for decoding a video, applicable to a decoder, comprises:

decoding a bitstream to obtain information to be decoded;

inputting the information to be decoded into a first decoding module to output first decoding information of a current coding unit;

determining side information having a correlation with the first decoding information;

filtering the first decoding information by using a preset network model and the side information, to obtain second decoding information; and reconstructing the current coding unit by using the second decoding information, to obtain a reconstructed unit of the current coding unit;

wherein the preset network model comprises a first network model, and the first network model comprises at least a first neural network model and a first adder; and the first neural network model comprises: a first convolution layer, at least one second convolution layer, first residual layers, second residual layers, average pooling layers, and sampling rate conversion modules; wherein the first convolution layer is followed by at least two of the first residual layers connected in series, and an average pooling layer is connected between adjacent first residual layers;

at least one of the first residual layers is followed by at least two of the second residual layers connected in series, and a sampling rate conversion module is connected between adjacent second residual layers; and at least one of the second residual layers is connected in series with the at least one second convolution layer;

wherein filtering the first decoding information by using the preset network model and the side information, to obtain the second decoding information comprises:

inputting the first decoding information and the side information into the first network model to output the second decoding information;

wherein the first network model is used for performing filtering on the first decoding information according to the correlation between the first decoding information and the side information, part of input ends of the first network model is shorted to an output end of the first network model, and an input end for the first decoding information in the first network model is shorted to the output end.

7. The method of claim 6, wherein the coding unit is a picture or an area in the picture.

8. The method of claim 6, wherein inputting the first decoding information and the side information into the first network model to output the second decoding information comprises:

inputting the first decoding information and the side information into the first neural network model to output a first intermediate value; and adding the first intermediate value to the first decoding information by the first adder, to obtain the second decoding information.

9. A decoder, comprises: a processor and a memory for storing a computer program executable by the processor, wherein the processor is configured to execute the computer program to:

decode a bitstream to obtain information to be decoded, and input the information to be decoded into a first decoding module to output first decoding information of a current coding unit;

determine side information having a correlation with the first decoding information;

filter the first decoding information by using a preset network model and the side information, to obtain second decoding information; and reconstruct the current coding unit by using the second decoding information, to obtain a reconstructed unit of the current coding unit;

wherein the preset network model comprises a first network model, and the first network model comprises at least a first neural network model and a first adder; and the first neural network model comprises: a first convolution layer, at least one second convolution layer, first residual layers, second residual layers, average pooling layers, and sampling rate conversion modules; wherein the first convolution layer is followed by at least two of the first residual layers connected in series, and an average pooling layer is connected between adjacent first residual layers;

at least one of the first residual layers is followed by at least two of the second residual layers connected in series, and a sampling rate conversion module is connected between adjacent second residual layers; and at least one of the second residual layers is connected in series with the at least one second convolution layer;

wherein the processor is further configured to execute the computer program to input the first decoding information and the side information into the first network model to output the second decoding information;

wherein the first network model is used for performing filtering on the first decoding information according to the correlation between the first decoding information and the side information, part of input ends of the first network model is shorted to an output end of the first network model, and an input end for the first decoding information in the first network model is shorted to the output end.

* * * * *